US011861977B2

(12) United States Patent
Petersen et al.

(10) Patent No.: US 11,861,977 B2
(45) **Date of Patent: *Jan. 2, 2024**

(54) GAMING SYSTEM PLAYER IDENTIFICATION DEVICE

(71) Applicant: IGT, Las Vegas, NV (US)

(72) Inventors: Erik B. Petersen, Reno, NV (US); Kevin M. Higgins, Reno, NV (US); Matthew Levin, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,869

(22) Filed: Jan. 9, 2023

(65) Prior Publication Data

US 2023/0162564 A1 May 25, 2023

Related U.S. Application Data

(63) Continuation of application No. 16/817,199, filed on Mar. 12, 2020, now Pat. No. 11,562,622, which is a continuation of application No. 15/678,410, filed on Aug. 16, 2017, now Pat. No. 10,621,824.

(60) Provisional application No. 62/398,846, filed on Sep. 23, 2016.

(51) Int. Cl.
*G07F 17/32* (2006.01)

(52) U.S. Cl.
CPC ...... *G07F 17/3239* (2013.01); *G07F 17/3213* (2013.01); *G07F 17/3218* (2013.01); *G07F 17/3241* (2013.01); *G07F 17/3244* (2013.01); *G07F 17/3258* (2013.01)

(58) Field of Classification Search
None
See application file for complete search history.

(56) References Cited

U.S. PATENT DOCUMENTS

| | | | |
|---|---|---|---|
| 3,662,105 | A | 5/1972 | Hurst |
| 4,071,689 | A | 1/1978 | Talmage |
| 4,072,930 | A | 2/1978 | Lucero |
| D247,828 | S | 5/1978 | Moore et al. |
| 4,159,054 | A | 6/1979 | Yoshida |
| 4,283,709 | A | 8/1981 | Lucero |
| 4,339,709 | A | 7/1982 | Brihier |
| 4,339,798 | A | 7/1982 | Hedges |

(Continued)

FOREIGN PATENT DOCUMENTS

| | | |
|---|---|---|
| CA | 2295043 | 1/1999 |
| EA | 008726 | 8/2007 |

(Continued)

OTHER PUBLICATIONS

EZ Pay® Card Accounts Advertisement, written by IGT, published in 2013 (1 page).

(Continued)

*Primary Examiner* — Peter J Iannuzzi
(74) *Attorney, Agent, or Firm* — Neal, Gerber & Eisenberg LLP

(57) ABSTRACT

The present disclosure relates generally to gaming systems and methods which utilize a player identification device to provide to electronic gaming machines certain gaming system functionality and features otherwise not associated with or available in association with the electronic gaming machines existing gaming establishment management systems.

20 Claims, 14 Drawing Sheets

(56) References Cited

U.S. PATENT DOCUMENTS

| | | | |
|---|---|---|---|
| 4,553,222 | A | 11/1985 | Kurland |
| 4,856,787 | A | 8/1989 | Itkis |
| 5,038,022 | A | 8/1991 | Lucero |
| 5,042,809 | A | 8/1991 | Richardson |
| 5,048,831 | A | 9/1991 | Sides |
| 5,179,517 | A | 1/1993 | Sarbin |
| 5,221,838 | A | 6/1993 | Gutman |
| 5,265,874 | A | 11/1993 | Dickinson et al. |
| 5,287,269 | A | 2/1994 | Dorrough et al. |
| 5,290,033 | A | 3/1994 | Bittner et al. |
| 5,371,345 | A | 12/1994 | Lestrange |
| D359,765 | S | 6/1995 | Izawa |
| 5,429,361 | A | 7/1995 | Raven |
| 5,457,306 | A | 10/1995 | Lucero |
| 5,470,079 | A | 11/1995 | LeStrange et al. |
| 5,483,049 | A | 1/1996 | Schulze, Jr. |
| 5,559,312 | A | 9/1996 | Lucero |
| 5,618,045 | A | 4/1997 | Kagan |
| 5,643,086 | A | 7/1997 | Alcorn |
| 5,655,961 | A | 8/1997 | Acres |
| 5,676,231 | A | 10/1997 | Legras |
| 5,702,304 | A | 12/1997 | Acres |
| 5,718,632 | A | 2/1998 | Hayashi |
| 5,741,183 | A | 4/1998 | Acres |
| 5,759,102 | A | 6/1998 | Pease |
| 5,761,647 | A | 6/1998 | Boushy |
| 5,768,382 | A | 6/1998 | Schneier |
| 5,769,716 | A | 6/1998 | Saffari |
| 5,770,533 | A | 6/1998 | Franchi |
| 5,779,545 | A | 7/1998 | Berg |
| 5,788,573 | A | 8/1998 | Baerlocher |
| 5,795,228 | A | 8/1998 | Trumbull |
| 5,796,389 | A | 8/1998 | Bertram |
| 5,797,085 | A | 8/1998 | Beuk |
| 5,809,482 | A | 9/1998 | Strisower |
| 5,811,772 | A | 9/1998 | Lucero |
| 5,816,918 | A | 10/1998 | Kelly |
| 5,818,019 | A | 10/1998 | Irwin, Jr. |
| 5,833,536 | A | 11/1998 | Davids |
| 5,833,540 | A | 11/1998 | Miodunski |
| 5,836,819 | A | 11/1998 | Ugawa |
| 5,851,148 | A | 12/1998 | Brune |
| 5,871,398 | A | 2/1999 | Schneier |
| D406,612 | S | 3/1999 | Johnson |
| 5,885,158 | A | 3/1999 | Torango |
| 5,919,091 | A | 7/1999 | Bell |
| 5,943,624 | A | 8/1999 | Fox et al. |
| 5,951,397 | A | 9/1999 | Dickinson |
| 5,952,640 | A | 9/1999 | Lucero |
| 5,954,583 | A | 9/1999 | Green |
| 5,957,776 | A | 9/1999 | Hoehne |
| 5,959,277 | A | 9/1999 | Lucero |
| 5,967,896 | A | 10/1999 | Jorasch |
| 5,971,271 | A | 10/1999 | Wynn |
| 5,984,779 | A | 11/1999 | Bridgeman |
| 5,999,808 | A | 12/1999 | Ladue |
| 6,001,016 | A | 12/1999 | Walker |
| 6,003,013 | A | 12/1999 | Boushy |
| 6,003,651 | A | 12/1999 | Waller |
| 6,010,404 | A | 1/2000 | Walker |
| 6,012,832 | A | 1/2000 | Saunders |
| 6,012,983 | A | 1/2000 | Walker |
| 6,019,283 | A | 2/2000 | Lucero |
| 6,038,666 | A | 3/2000 | Hsu |
| 6,048,269 | A | 4/2000 | Burns |
| 6,050,895 | A | 4/2000 | Luciano |
| 6,062,981 | A | 5/2000 | Luciano |
| 6,068,552 | A | 5/2000 | Walker |
| 6,077,163 | A | 6/2000 | Walker |
| 6,089,975 | A | 7/2000 | Dunn |
| 6,099,408 | A | 8/2000 | Schneier |
| 6,104,815 | A | 8/2000 | Alcorn |
| 6,106,396 | A | 8/2000 | Alcorn |
| 6,110,041 | A | 8/2000 | Walker et al. |
| 6,113,492 | A | 9/2000 | Walker |
| 6,113,493 | A | 9/2000 | Walker |
| 6,113,495 | A | 9/2000 | Walker |
| 6,135,884 | A | 10/2000 | Hedrick |
| 6,135,887 | A | 10/2000 | Pease |
| 6,139,431 | A | 10/2000 | Walker |
| 6,141,711 | A | 10/2000 | Shah |
| 6,142,369 | A | 11/2000 | Jonstromer |
| 6,149,522 | A | 11/2000 | Alcorn |
| 6,161,059 | A | 12/2000 | Tedesco |
| 6,162,121 | A | 12/2000 | Morro |
| 6,162,122 | A | 12/2000 | Acres |
| 6,174,234 | B1 | 1/2001 | Seibert, Jr. |
| 6,182,221 | B1 | 1/2001 | Hsu |
| 6,183,362 | B1 | 2/2001 | Boushy |
| 6,190,256 | B1 | 2/2001 | Walker |
| 6,206,283 | B1 | 3/2001 | Bansal |
| 6,210,279 | B1 | 4/2001 | Dickinson |
| 6,223,166 | B1 | 4/2001 | Kay |
| 6,227,972 | B1 | 5/2001 | Walker |
| 6,244,958 | B1 | 6/2001 | Acres |
| 6,247,643 | B1 | 6/2001 | Lucero |
| 6,253,119 | B1 | 6/2001 | Dabrowski |
| 6,264,560 | B1 | 7/2001 | Goldberg |
| 6,264,561 | B1 | 7/2001 | Saffari |
| 6,267,671 | B1 | 7/2001 | Hogan |
| 6,270,410 | B1 | 8/2001 | Demar |
| 6,280,328 | B1 | 8/2001 | Holch |
| 6,285,868 | B1 | 9/2001 | Ladue |
| 6,293,866 | B1 | 9/2001 | Walker |
| 6,302,790 | B1 | 10/2001 | Brossard |
| 6,307,956 | B1 | 10/2001 | Black |
| 6,319,125 | B1 | 11/2001 | Acres |
| 6,341,353 | B1 | 1/2002 | Herman |
| 6,368,216 | B1 | 4/2002 | Hedrick |
| 6,371,852 | B1 | 4/2002 | Acres |
| 6,378,073 | B1 | 4/2002 | Davis |
| 6,379,246 | B1 | 4/2002 | Dabrowski |
| 6,383,076 | B1 | 5/2002 | Tiedeken |
| 6,409,595 | B1 | 6/2002 | Uihlein |
| 6,409,602 | B1 | 6/2002 | Wiltshire |
| 6,443,843 | B1 | 9/2002 | Walker |
| 6,450,885 | B2 | 9/2002 | Schneier |
| 6,488,585 | B1 | 12/2002 | Wells |
| 6,496,928 | B1 | 12/2002 | Deo |
| 6,511,377 | B1 | 1/2003 | Weiss |
| 6,530,835 | B1 | 3/2003 | Walker |
| 6,561,903 | B2 | 5/2003 | Walker |
| 6,581,161 | B1 | 6/2003 | Byford |
| 6,582,310 | B1 | 6/2003 | Walker |
| 6,585,598 | B2 | 7/2003 | Nguyen |
| 6,628,939 | B2 | 9/2003 | Paulsen |
| 6,634,550 | B1 | 10/2003 | Walker et al. |
| 6,648,761 | B1 | 11/2003 | Izawa et al. |
| 6,676,522 | B2 | 1/2004 | Rowe et al. |
| 6,682,421 | B1 | 1/2004 | Rowe |
| 6,685,567 | B2 | 2/2004 | Cockerille |
| 6,702,670 | B2 | 3/2004 | Jasper et al. |
| 6,712,191 | B2 | 3/2004 | Hand |
| D488,512 | S | 4/2004 | Knobel |
| D490,473 | S | 5/2004 | Knobel |
| 6,739,975 | B2 | 5/2004 | Nguyen |
| 6,758,393 | B1 | 7/2004 | Luciano |
| 6,800,029 | B2 | 10/2004 | Rowe |
| 6,831,682 | B1 | 12/2004 | Silverbrook et al. |
| 6,846,238 | B2 | 1/2005 | Wells |
| 6,850,916 | B1 | 2/2005 | Wang |
| 6,869,362 | B2 | 3/2005 | Walker |
| 6,880,079 | B2 | 4/2005 | Kefford |
| 6,896,618 | B2 | 5/2005 | Benoy |
| 6,905,411 | B2 | 6/2005 | Nguyen et al. |
| 6,935,957 | B1 | 8/2005 | Yates et al. |
| 6,941,285 | B2 | 9/2005 | Sarcanin |
| 6,969,319 | B2 | 11/2005 | Rowe et al. |
| 7,004,388 | B2 | 2/2006 | Kohta |
| 7,004,837 | B1 | 2/2006 | Crowder et al. |
| D523,482 | S | 6/2006 | Uemizo |
| 7,153,210 | B2 | 12/2006 | Yamagishi |
| 7,167,724 | B2 | 1/2007 | Yamagishi |
| 7,169,052 | B2 | 1/2007 | Beaulieu |

(56) References Cited

U.S. PATENT DOCUMENTS

| | | | |
|---|---|---|---|
| 7,213,750 | B1 | 5/2007 | Barnes et al. |
| D547,806 | S | 7/2007 | Uemizo |
| 7,252,232 | B2 | 8/2007 | Fernandes et al. |
| 7,275,991 | B2 | 10/2007 | Burns |
| 7,331,520 | B2 | 2/2008 | Silva |
| 7,335,106 | B2 | 2/2008 | Johnson |
| 7,337,330 | B2 | 2/2008 | Gatto |
| 7,341,522 | B2 | 3/2008 | Yamagishi |
| 7,403,788 | B2 | 7/2008 | Trioano et al. |
| 7,416,485 | B2 | 8/2008 | Walker |
| 7,419,428 | B2 | 9/2008 | Rowe |
| 7,467,999 | B2 | 12/2008 | Walker |
| 7,477,889 | B2 | 1/2009 | Kim |
| 7,510,474 | B2 | 3/2009 | Carter, Sr. |
| 7,545,522 | B1 | 6/2009 | Lou |
| 7,552,341 | B2 | 6/2009 | Chen |
| 7,594,855 | B2 | 9/2009 | Meyerhofer |
| 7,611,409 | B2 | 11/2009 | Muir et al. |
| 7,644,861 | B2 | 1/2010 | Alderucci |
| 7,693,306 | B2 | 4/2010 | Huber |
| 7,699,703 | B2 | 4/2010 | Muir |
| 7,701,344 | B2 | 4/2010 | Mattice et al. |
| 7,753,789 | B2 | 7/2010 | Walker et al. |
| 7,758,420 | B2 | 7/2010 | Saffari |
| 7,771,271 | B2 | 8/2010 | Walker et al. |
| 7,785,193 | B2 | 8/2010 | Paulsen et al. |
| 7,803,053 | B2 | 9/2010 | Atkinson |
| D628,576 | S | 12/2010 | Daniel |
| 7,846,017 | B2 | 12/2010 | Walker et al. |
| 7,850,522 | B2 | 12/2010 | Walker et al. |
| 7,883,417 | B2 | 2/2011 | Bruzzese |
| 7,908,216 | B1 | 3/2011 | Davis et al. |
| 7,950,996 | B2 | 5/2011 | Nguyen et al. |
| 7,988,550 | B2 | 8/2011 | White |
| 7,997,972 | B2 | 8/2011 | Nguyen et al. |
| 8,016,666 | B2 | 9/2011 | Angell et al. |
| 8,023,133 | B2 | 9/2011 | Kaneko |
| 8,038,527 | B2 | 10/2011 | Walker et al. |
| 8,046,261 | B2 | 10/2011 | Ghosh et al. |
| 8,057,303 | B2 | 11/2011 | Rasmussen |
| 8,079,904 | B2 | 12/2011 | Griswold |
| 8,096,872 | B2 | 1/2012 | Walker et al. |
| 8,118,668 | B2 | 2/2012 | Gagner et al. |
| 8,127,999 | B2 | 3/2012 | Diamond |
| 8,144,356 | B2 | 3/2012 | Meyerhofer |
| 8,157,642 | B2 | 4/2012 | Paulsen |
| 8,192,276 | B2 | 6/2012 | Walker et al. |
| 8,219,129 | B2 | 7/2012 | Brown |
| 8,220,019 | B2 | 7/2012 | Stearns et al. |
| 8,241,127 | B2 | 8/2012 | Kovacs |
| 8,282,465 | B2 | 10/2012 | Giobbi |
| 8,282,490 | B2 | 10/2012 | Arezina |
| 8,286,856 | B2 | 10/2012 | Meyerhofer et al. |
| 8,350,668 | B2 | 1/2013 | Busch-Sorensen |
| 8,393,955 | B2 | 3/2013 | Arezina et al. |
| 8,419,548 | B2 | 4/2013 | Gagner |
| 8,430,749 | B2 | 4/2013 | Nelson et al. |
| 8,469,800 | B2 | 6/2013 | Lemay et al. |
| 8,512,144 | B2 | 8/2013 | Johnson et al. |
| 8,550,903 | B2 | 10/2013 | Lyons |
| 8,597,108 | B2 | 12/2013 | Nguyen |
| 8,597,111 | B2 | 12/2013 | Lemay et al. |
| 8,602,875 | B2 | 12/2013 | Nguyen |
| 8,608,569 | B2 | 12/2013 | Carrico |
| 8,613,659 | B2 | 12/2013 | Nelson |
| 8,613,668 | B2 | 12/2013 | Nelson et al. |
| 8,616,984 | B2 | 12/2013 | Mattice et al. |
| 8,622,836 | B2 | 1/2014 | Nelson et al. |
| 8,696,463 | B2 | 4/2014 | Potts et al. |
| 8,721,434 | B2 | 5/2014 | Nelson et al. |
| 8,721,449 | B2 | 5/2014 | Johnson et al. |
| 8,734,236 | B2 | 5/2014 | Arezina et al. |
| 8,758,102 | B2 | 6/2014 | Block et al. |
| 8,814,683 | B2 | 8/2014 | Hollander et al. |
| 8,827,813 | B2 | 9/2014 | Lemay et al. |
| 8,827,814 | B2 | 9/2014 | Lemay et al. |
| 8,851,386 | B2 | 10/2014 | Phillips |
| 8,876,595 | B2 | 11/2014 | Nelson et al. |
| 8,932,140 | B2 | 1/2015 | Gagner et al. |
| 8,956,222 | B2 | 2/2015 | Lemay et al. |
| 8,961,306 | B2 | 2/2015 | Lemay |
| 8,971,421 | B2 | 3/2015 | Tam et al. |
| 8,978,868 | B2 | 3/2015 | Johnson et al. |
| 9,011,236 | B2 | 4/2015 | Nelson et al. |
| 9,153,095 | B2 | 10/2015 | Adiraju et al. |
| 9,367,835 | B2 | 6/2016 | Nelson et al. |
| 9,564,004 | B2 | 2/2017 | Johnson |
| 9,582,963 | B2 | 2/2017 | Johnson |
| 10,127,765 | B1 | 11/2018 | Johnson |
| 11,562,622 | B2 * | 1/2023 | Petersen ............. G07F 17/3218 |
| 2001/0039204 | A1 | 11/2001 | Tanskanen |
| 2001/0044337 | A1 | 11/2001 | Rowe |
| 2002/0020603 | A1 | 2/2002 | Jones |
| 2002/0061778 | A1 | 5/2002 | Acres |
| 2002/0077182 | A1 | 6/2002 | Swanberg |
| 2002/0082070 | A1 | 6/2002 | Macke et al. |
| 2002/0087641 | A1 | 7/2002 | Levosky |
| 2002/0090986 | A1 | 7/2002 | Cote et al. |
| 2002/0094869 | A1 | 7/2002 | Harkham |
| 2002/0107066 | A1 | 8/2002 | Seelig |
| 2002/0111206 | A1 | 8/2002 | Van Baltz et al. |
| 2002/0111209 | A1 | 8/2002 | Walker |
| 2002/0123965 | A1 | 9/2002 | Phillips |
| 2002/0132666 | A1 | 9/2002 | Lind |
| 2002/0145035 | A1 | 10/2002 | Jones |
| 2002/0147047 | A1 | 10/2002 | Letovsky |
| 2002/0147049 | A1 | 10/2002 | Carter, Sr. |
| 2002/0163570 | A1 | 11/2002 | Phillips |
| 2002/0169623 | A1 | 11/2002 | Call et al. |
| 2002/0183046 | A1 | 12/2002 | Joyce et al. |
| 2002/0196342 | A1 | 12/2002 | Walker |
| 2003/0003988 | A1 | 1/2003 | Walker |
| 2003/0008707 | A1 | 1/2003 | Walker et al. |
| 2003/0027632 | A1 | 2/2003 | Sines |
| 2003/0032485 | A1 | 2/2003 | Cockerille |
| 2003/0045354 | A1 | 3/2003 | Giobbi |
| 2003/0054868 | A1 | 3/2003 | Paulsen et al. |
| 2003/0054881 | A1 | 3/2003 | Hedrick |
| 2003/0064805 | A1 | 4/2003 | Wells |
| 2003/0074259 | A1 | 4/2003 | Slyman, Jr. et al. |
| 2003/0083126 | A1 | 5/2003 | Paulsen |
| 2003/0083943 | A1 | 5/2003 | Adams |
| 2003/0092477 | A1 | 5/2003 | Luciano, Jr. et al. |
| 2003/0104865 | A1 | 6/2003 | Itkis |
| 2003/0141359 | A1 | 7/2003 | Dymovsky |
| 2003/0144052 | A1 | 7/2003 | Walker |
| 2003/0148812 | A1 | 8/2003 | Paulsen |
| 2003/0162591 | A1 | 8/2003 | Nguyen et al. |
| 2003/0172037 | A1 | 9/2003 | Jung |
| 2003/0186739 | A1 | 10/2003 | Paulsen et al. |
| 2003/0199321 | A1 | 10/2003 | Williams |
| 2003/0203756 | A1 | 10/2003 | Jackson |
| 2003/0224852 | A1 | 12/2003 | Walker |
| 2003/0228900 | A1 | 12/2003 | Yamagishi |
| 2004/0014514 | A1 | 1/2004 | Yacenda |
| 2004/0016797 | A1 | 1/2004 | Jones |
| 2004/0023721 | A1 | 2/2004 | Giobbi |
| 2004/0039635 | A1 | 2/2004 | Linde |
| 2004/0043814 | A1 | 3/2004 | Angell et al. |
| 2004/0085293 | A1 | 5/2004 | Soper |
| 2004/0088250 | A1 | 5/2004 | Bartter et al. |
| 2004/0106454 | A1 | 6/2004 | Walker |
| 2004/0127277 | A1 | 7/2004 | Walker |
| 2004/0129773 | A1 | 7/2004 | Lute, Jr. |
| 2004/0147314 | A1 | 7/2004 | Lemay |
| 2004/0185935 | A1 | 9/2004 | Yamagishi |
| 2004/0190042 | A1 | 9/2004 | Ferlitsch et al. |
| 2004/0192434 | A1 | 9/2004 | Walker |
| 2004/0199284 | A1 | 10/2004 | Hara |
| 2004/0209690 | A1 | 10/2004 | Bruzzese |
| 2004/0225565 | A1 | 11/2004 | Selman |
| 2004/0230527 | A1 | 11/2004 | Hansen et al. |
| 2004/0259640 | A1 | 12/2004 | Gentles |
| 2004/0266395 | A1 | 12/2004 | Pailles |

(56) References Cited

U.S. PATENT DOCUMENTS

2005/0014554 A1 1/2005 Walker
2005/0020354 A1 1/2005 Nguyen et al.
2005/0049049 A1 3/2005 Griswold et al.
2005/0054438 A1 3/2005 Rothschild
2005/0059485 A1 3/2005 Paulsen
2005/0070257 A1 3/2005 Saarinen
2005/0076242 A1 4/2005 Breuer
2005/0101383 A1 5/2005 Wells
2005/0130728 A1 6/2005 Nguyen
2005/0173220 A1 8/2005 Liu et al.
2005/0227770 A1 10/2005 Papulov
2005/0240484 A1 10/2005 Yan
2005/0255911 A1 11/2005 Nguyen et al.
2005/0261061 A1 11/2005 Nguyen et al.
2005/0287852 A1 12/2005 Sugawara
2006/0018450 A1 1/2006 Sandberg-Diment
2006/0025206 A1 2/2006 Walker
2006/0025222 A1 2/2006 Sekine
2006/0035707 A1 2/2006 Nguyen
2006/0040741 A1 2/2006 Griswold
2006/0046823 A1 3/2006 Kaminkow
2006/0046834 A1 3/2006 Sekine
2006/0046842 A1 3/2006 Mattice
2006/0046855 A1 3/2006 Nguyen et al.
2006/0049624 A1 3/2006 Brosnan et al.
2006/0064372 A1 3/2006 Gupta
2006/0079333 A1 4/2006 Morrow
2006/0089174 A1 4/2006 Twerdahl
2006/0118382 A1 6/2006 Yoshioka
2006/0160621 A1 7/2006 Rowe et al.
2006/0165060 A1 7/2006 Dua
2006/0166732 A1 7/2006 Lechner et al.
2006/0166741 A1 7/2006 Boyd et al.
2006/0173781 A1 8/2006 Donner
2006/0189382 A1 8/2006 Muir
2006/0223627 A1 10/2006 Nozaki
2006/0226598 A1 10/2006 Walker
2006/0246981 A1 11/2006 Walker et al.
2006/0247037 A1 11/2006 Park
2006/0252530 A1 11/2006 Oberberger et al.
2006/0258439 A1 11/2006 White
2006/0266598 A1 11/2006 Baumgartner et al.
2006/0271433 A1 11/2006 Hughes
2006/0279781 A1 12/2006 Kaneko
2006/0281554 A1 12/2006 Gatto et al.
2006/0287072 A1 12/2006 Walker
2006/0287098 A1 12/2006 Morrow et al.
2007/0017979 A1 1/2007 Wu et al.
2007/0021198 A1 1/2007 Muir
2007/0060302 A1 3/2007 Fabbri
2007/0060326 A1 3/2007 Juds et al.
2007/0060372 A1 3/2007 Yamagishi
2007/0117608 A1 5/2007 Roper et al.
2007/0117623 A1 5/2007 Nelson
2007/0129150 A1 6/2007 Crowder, Jr. et al.
2007/0129151 A1 6/2007 Crowder, Jr. et al.
2007/0155469 A1 7/2007 Johnson
2007/0159301 A1 7/2007 Hirt
2007/0174809 A1 7/2007 Brown
2007/0190494 A1 8/2007 Rosenberg
2007/0197247 A1 8/2007 Inselberg
2007/0202941 A1 8/2007 Miltenberger et al.
2007/0218971 A1 9/2007 Berube
2007/0218985 A1 9/2007 Okada
2007/0218991 A1 9/2007 Okada
2007/0238505 A1 10/2007 Okada
2007/0243928 A1 10/2007 Iddings
2007/0267488 A1 11/2007 Chang
2008/0011832 A1 1/2008 Chang
2008/0026816 A1 1/2008 Sammon
2008/0026823 A1 1/2008 Wolf et al.
2008/0026844 A1 1/2008 Wells
2008/0070671 A1 3/2008 Okada
2008/0076528 A1 3/2008 Nguyen et al.
2008/0076572 A1 3/2008 Nguyen et al.
2008/0085753 A1 4/2008 Okada
2008/0139306 A1 6/2008 Lutnick
2008/0166997 A1 7/2008 Sun et al.
2008/0182644 A1 7/2008 Lutnick et al.
2008/0200240 A1 8/2008 Saltiel et al.
2008/0200251 A1 8/2008 Alderucci et al.
2008/0207296 A1 8/2008 Lutnick et al.
2008/0213026 A1 9/2008 Grabiec
2008/0214261 A1 9/2008 Alderucci
2008/0220878 A1 9/2008 Michaelis
2008/0234028 A1 9/2008 Meyer et al.
2008/0261682 A1 10/2008 Phillips
2008/0268934 A1 10/2008 Mattice et al.
2008/0270302 A1 10/2008 Beenau et al.
2008/0293483 A1 11/2008 Pickus
2008/0300047 A1 12/2008 Nagano
2008/0300061 A1 12/2008 Zheng
2008/0305860 A1 12/2008 Linner
2008/0305862 A1 12/2008 Walker et al.
2008/0305873 A1 12/2008 Zheng
2008/0311971 A1 12/2008 Dean
2008/0318655 A1 12/2008 Davies
2009/0011821 A1 1/2009 Griswold
2009/0023490 A1 1/2009 Moshal
2009/0029766 A1 1/2009 Lutnick
2009/0054149 A1 2/2009 Brosnan et al.
2009/0098943 A1 4/2009 Weber et al.
2009/0124350 A1 5/2009 Iddings et al.
2009/0124376 A1 5/2009 Kelly et al.
2009/0125429 A1 5/2009 Takayama
2009/0131134 A1 5/2009 Baerlocher et al.
2009/0131146 A1 5/2009 Arezina et al.
2009/0158400 A1 6/2009 Miyake
2009/0186680 A1 7/2009 Napolitano
2009/0197684 A1 8/2009 Arezina
2009/0227317 A1 9/2009 Spangler
2009/0233715 A1 9/2009 Ergen
2009/0275397 A1 11/2009 Van Baltz et al.
2009/0313084 A1 12/2009 Chugh
2009/0328144 A1 12/2009 Sherlock et al.
2010/0012715 A1 1/2010 Williams
2010/0016075 A1 1/2010 Thomas
2010/0029376 A1 2/2010 Hardy et al.
2010/0036758 A1 2/2010 Monk
2010/0048291 A1 2/2010 Warkentin
2010/0048297 A1 2/2010 Dasgupta
2010/0062840 A1 3/2010 Herrmann
2010/0069160 A1 3/2010 Barrett
2010/0087241 A1 4/2010 Nguyen
2010/0087249 A1 4/2010 Rowe
2010/0093421 A1 4/2010 Nyman
2010/0093429 A1 4/2010 Mattice
2010/0094734 A1 4/2010 Wang
2010/0113061 A1 5/2010 Holcman
2010/0113161 A1 5/2010 Walker
2010/0124983 A1 5/2010 Gowin et al.
2010/0155462 A1 6/2010 Morrison et al.
2010/0173691 A1 7/2010 Wolfe
2010/0174650 A1 7/2010 Nonaka
2010/0178986 A1 7/2010 Davis et al.
2010/0219234 A1 9/2010 Forbes
2010/0222100 A1 9/2010 Dragt
2010/0225653 A1 9/2010 Sao et al.
2010/0227670 A1 9/2010 Arezina et al.
2010/0234099 A1 9/2010 Rasmussen
2010/0250787 A1 9/2010 Miyata
2010/0304848 A1 12/2010 Detlefsen
2010/0323785 A1 12/2010 Motyl
2010/0323789 A1 12/2010 Gabriele
2010/0331079 A1 12/2010 Bytnar
2011/0015976 A1 1/2011 Lempel et al.
2011/0028199 A1 2/2011 Luciano et al.
2011/0035319 A1 2/2011 Brand et al.
2011/0057028 A1 3/2011 Schwartz
2011/0065496 A1 3/2011 Gagner et al.
2011/0065497 A1 3/2011 Patterson, Jr.
2011/0070940 A1 3/2011 Jaffe
2011/0076963 A1 3/2011 Hatano
2011/0086691 A1 4/2011 Luciano et al.

(56) References Cited

U.S. PATENT DOCUMENTS

2011/0086696 A1 4/2011 Macewan
2011/0098104 A1 4/2011 Meyerhofer
2011/0118008 A1 5/2011 Taylor
2011/0119098 A1 5/2011 Miller
2011/0136576 A1 6/2011 Kammler et al.
2011/0166989 A1 7/2011 Ross et al.
2011/0207531 A1 8/2011 Gagner
2011/0208418 A1 8/2011 Looney et al.
2011/0242565 A1 10/2011 Armstrong
2011/0263325 A1 10/2011 Atkinson
2011/0287823 A1 11/2011 Guinn et al.
2011/0295668 A1 12/2011 Charania
2011/0306400 A1 12/2011 Nguyen
2011/0306401 A1 12/2011 Nguyen
2011/0307318 A1 12/2011 Laporte et al.
2011/0314153 A1 12/2011 Bathiche
2012/0015735 A1 1/2012 Abouchar
2012/0046110 A1 2/2012 Amaitis
2012/0047008 A1 2/2012 Alhadeff et al.
2012/0066048 A1 3/2012 Foust et al.
2012/0067944 A1 3/2012 Ross
2012/0072111 A1 3/2012 Davis
2012/0084131 A1 4/2012 Bergel et al.
2012/0094757 A1 4/2012 Vago
2012/0115593 A1 5/2012 Vann et al.
2012/0122584 A1 5/2012 Nguyen
2012/0122585 A1 5/2012 Nguyen
2012/0129586 A1 5/2012 Lutnick
2012/0129611 A1 5/2012 Rasmussen
2012/0149561 A1 6/2012 Ribi et al.
2012/0187187 A1 7/2012 Duff
2012/0190455 A1 7/2012 Briggs
2012/0208627 A1 8/2012 Kitakaze et al.
2012/0221474 A1 8/2012 Eicher et al.
2012/0239552 A1 9/2012 Harycki
2012/0252556 A1 10/2012 Doyle et al.
2012/0265681 A1 10/2012 Ross
2012/0276990 A1 11/2012 Arezina
2012/0290336 A1 11/2012 Rosenblatt
2012/0296174 A1 11/2012 McCombie
2012/0300753 A1 11/2012 Brown
2012/0311322 A1 12/2012 Koyun
2012/0315984 A1 12/2012 Carrico et al.
2012/0324135 A1 12/2012 Goodman
2013/0013389 A1 1/2013 Vitti et al.
2013/0017877 A1 1/2013 Dahl
2013/0017884 A1 1/2013 Price
2013/0023339 A1 1/2013 Davis
2013/0053133 A1 2/2013 Schueller
2013/0053136 A1 2/2013 Lemay et al.
2013/0053148 A1 2/2013 Nelson et al.
2013/0065667 A1 3/2013 Nelson et al.
2013/0065668 A1 3/2013 Lemay et al.
2013/0065678 A1 3/2013 Nelson et al.
2013/0065686 A1 3/2013 Lemay et al.
2013/0085943 A1 4/2013 Takeda et al.
2013/0090155 A1 4/2013 Johnson
2013/0124413 A1 5/2013 Itwaru
2013/0130777 A1 5/2013 Lemay et al.
2013/0130778 A1 5/2013 Anderson et al.
2013/0137509 A1 5/2013 Weber et al.
2013/0137510 A1 5/2013 Weber et al.
2013/0137516 A1 5/2013 Griswold et al.
2013/0165199 A1 6/2013 Lemay
2013/0165208 A1 6/2013 Nelson
2013/0165209 A1 6/2013 Lemay
2013/0165210 A1 6/2013 Nelson
2013/0165231 A1 6/2013 Nelson
2013/0165232 A1 6/2013 Nelson
2013/0190077 A1 7/2013 Arezina et al.
2013/0196747 A1 8/2013 Nguyen
2013/0196755 A1 8/2013 Nelson
2013/0225279 A1 8/2013 Patceg et al.
2013/0244772 A1 9/2013 Weber
2013/0252713 A1 9/2013 Nelson
2013/0260889 A1 10/2013 Lemay et al.
2013/0275314 A1 10/2013 Bowles
2013/0299574 A1 11/2013 Theobald
2013/0316808 A1 11/2013 Nelson
2013/0317987 A1 11/2013 Tsutsui
2013/0324237 A1 12/2013 Adiraju et al.
2013/0337890 A1 12/2013 Earley et al.
2013/0344942 A1 12/2013 Price et al.
2014/0018153 A1 1/2014 Nelson et al.
2014/0045586 A1 2/2014 Allen et al.
2014/0080578 A1 3/2014 Nguyen
2014/0087849 A1 * 3/2014 Page .................. G07F 17/3246
463/25
2014/0087865 A1 3/2014 Carrico et al.
2014/0121005 A1 5/2014 Nelson et al.
2014/0200065 A1 7/2014 Anderson
2014/0221099 A1 8/2014 Johnson
2014/0248941 A1 9/2014 Nelson et al.
2014/0274306 A1 9/2014 Crawford, III
2014/0323206 A1 10/2014 Gagner et al.
2014/0357353 A1 12/2014 Popovich
2015/0012305 A1 1/2015 Truskovsky
2015/0065231 A1 3/2015 Anderson et al.
2015/0087408 A1 3/2015 Siemasko et al.
2015/0170473 A1 6/2015 Hematji et al.
2015/0187158 A1 7/2015 Johnson et al.
2015/0243133 A1 8/2015 Nicholas
2015/0319613 A1 11/2015 Shmilov
2016/0071373 A1 3/2016 Anderson et al.
2016/0093166 A1 3/2016 Panambur et al.
2017/0092054 A1 3/2017 Petersen et al.

FOREIGN PATENT DOCUMENTS

EP 0936530 8/1999
EP 1107196 6/2001
EP 1895483 3/2008
EP 1988575 11/2008
JP 2001-243376 9/2001
JP 2002-123619 4/2002
JP 2007-082934 4/2007
JP 2007-141055 6/2007
JP 2007-328388 12/2007
JP 2008-027117 2/2008
JP 2008-171203 7/2008
JP 2008-228848 10/2008
JP 2008-287446 11/2008
JP 2009-015829 1/2009
JP 2009-048376 3/2009
JP 2009-258799 11/2009
JP 2010-009161 1/2010
WO WO 01/93212 12/2001
WO WO 2007/006084 1/2007
WO WO 2007/142980 12/2007
WO WO 2009/026320 2/2009
WO WO 2012/112602 8/2012

OTHER PUBLICATIONS

EZ Pay® Ticketing Advertisement, written by IGT, published in 2013 (1 page).
IGT Advantage® sb NexGen® II Advertisement, written by IGT, published in 2010 (2 pages).
"JCM Global, Techfirm Inc. and NRT Technology Corp. to Present First Fully Integrated NFC-Based Interactive Mobile Wager Network That Connects Player, Mobile Wager Wallet, QuickJack™ ATM and Gaming Device" online article published Oct. 1, 2012, retrieved from http://finance.yahoo.com/news/jcm-global-techfirm-inc-nrt-150000276.html (5 pages).
"Data Communication Networks: Open Systems Interconnection (OSI); Security, Structure and Applications; Security Architecture for Open Systems Interconnection for CCITT Application," article written by International Telecommunication Union, published in 1991 (48 pages).
"Wireline/Wireless RF-Interconnect for Future SoC," article written by Sai-Wang Tam et al., published in Nov. 2011 (5 pages).

(56) References Cited

OTHER PUBLICATIONS

"RF/Wireless Interconnect for Inter- and Intra-Chip Communications," article written by Mau-Chung et al., published in the Proceedings of the IEEE, vol. 89, No. 4, Apr. 2001 (12 pages).
"Banking through Networks of Retail Agents," article written by CGAP, Focus Note 47, Published in May 2008 (24 pages).
"S2S™ Message Protocol v1 .2," written by Gaming Standards Association, published on Aug. 8, 2006 (541 pages).
"Electronic Payment Systems: Strategic and Technical Issues," written by K. Bohle, et al., published by Institute for Prospective Technological Studies, Dec. 2000 (26 pages).
Australian Examination Report No. 1 for Application No. 2017219094 dated Nov. 8, 2021 (4 pages).

* cited by examiner

1000

GAMING SYSTEM PLAYER IDENTIFICATION DEVICE

PRIORITY CLAIM

This application is a continuation of, claims the benefit of and priority to U.S. patent application Ser. No. 16/817,199, filed on Mar. 12, 2020, which is a continuation of, claims the benefit of and priority to U.S. patent application Ser. No. 15/678,410, filed on Aug. 16, 2017, which claims the benefit of and priority to U.S. Provisional Patent Application No. 62/398,846, filed on Sep. 23, 2016, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards for obtaining winning symbol combinations in plays of primary or base games are well known. Such gaming machines generally require the player to place or make a primary or base wager to activate the primary or base game.

To fund such primary or base wagers, many of these gaming machines receive from a player one or more of an amount of cash, a ticket voucher (i.e., a bearer instrument redeemable for cash or game play on a gaming machine) or a promotional ticket (i.e., an instrument associated with a quantity of promotional credits redeemable for game play on a gaming machine, but not otherwise redeemable for cash). After establishing a quantity of credits of a credit balance based on the received cash, ticket voucher and/or promotional ticket, the gaming machine enables the player to wager such credits on one or more plays of one or more primary or base games. In addition to receiving cash, ticket vouchers and/or promotional tickets to establish a credit balance to wager from, many known gaming machines utilizes ticket vouchers when a player wishes to leave the gaming machine and has credits remaining on the gaming machine.

While the utilization of such ticket vouchers decreases certain known problems previously associated with gaming machines that dispensed coins or cash, the utilization of ticket vouchers and/or promotional tickets is still associated with various incurred labor and material costs. For example, the utilization of ticket vouchers is associated with the labor costs of having to periodically remove a cash box including received ticket vouchers and cash from the gaming machine, replace the removed cash box with an empty one and refill the blank ticket voucher stacks housed by the gaming machine. The utilization of such ticket vouchers is further associated with the various labor costs of counting the cash and ticket vouchers removed from the gaming machine and providing security associated with the removal, transport and subsequent counting of such cash and ticket vouchers. Accordingly, there exists a continuing need to reduce the utilization of ticket vouchers at gaming machines without the associated costs of having to install a new and relatively expensive system to do so.

Many known gaming machines are also in communication with a player loyalty or player tracking system configured to track such game play and other player activities. Specifically, a gaming establishment operator will employ one manufacturer's player tracking system in a gaming establishment and install (or cause to be installed) the player tracking units of that manufacturer's player tracking system in the different gaming machines manufactured by the different gaming machine manufacturers at that gaming establishment. In operation of these player tracking systems, player identification information is stored in association with a created player account and a physical instrument, such as a magnetic striped card, is issued to the player. The physical instrument is associated with the created player account and can be utilized during various activities within a gaming establishment to associate certain activities with a particular player. For example, a player can insert a magnetic-striped player tracking card into a card reader of the player tracking unit associated with a gaming machine to have a record of the player's gaming activity on the gaming machine stored to the account associated with the player tracking card. Such a player tracking unit may also include a player tracking processor configured to track the player's gaming activity and report such gaming activity to a gaming establishment management system which operates with one or more servers, such as one or more accounting servers, and player tracking system servers. Such a player tracking unit may also include one or more of: a display device to display the player's name and balance of player tracking points, one or more input devices, such as a touch screen or keypad to enable the player to enter a Personal Identification Number, and an interface connected to a slot machine interface board (that is connected to a communication port of the gaming machine and is configured to receive data from a gaming machine processor and transmit the data to the gaming establishment management system according to a designated communication protocol). Based on the player's gaming activities, such as an amount wagered, the gaming establishment may offer the player certain "comps" (i.e., complimentary offers), such as free or discounted services. In addition, the gaming establishment may mine and analyze the information gathered from the loyalty program to identify demographic information and behavioral patterns of their customers. This analysis can then be used to expand and personalize the complimentary offers provided to players.

While the utilization of gaming machines with player tracking units enhances certain player loyalty via facilitating that complementary offers are provided to certain players, known player tracking units are limited to tracking player activity and reporting such tracked player activity to an associated gaming establishment management system. Additionally, since different gaming establishments may each maintain a distinct player tracking account for a player (and thus may provide a distinct player tracking card to the player), players that frequent a plurality of different gaming establishments may need to carry a plurality of different player tracking cards with them. Accordingly, there is a continuing need to enable players that are enrolled in a plurality of player tracking systems to avoid having to carry a plurality of different player tracking cards. Moreover, while certain gaming establishment management systems provide player tracking functionality (via the player tracking units) and accounting functionality (via metering data communicated from the gaming machine), certain other gaming establishment management systems provide additional functionality such as bonusing functionality and/or progressive award functionality. However, since gaming establishment management systems are relatively expensive and time consuming to replace (and thus associated with the requisite gaming machine downtime during such replacement), gaming establishments are reluctant to replace previously installed gaming establishment management systems despite such gaming establishment management systems lacking certain functionality (bonusing functionality and/or progressive award functionality) which certain player's prefer. Accordingly, certain gaming establishments are in need of providing such additional gaming establishment management system functionality without the associated costs or gaming machine downtime associated with a complete replacement of the existing gaming establishment management system.

SUMMARY

The present disclosure relates generally to gaming systems and methods which utilize a player identification device to provide to electronic gaming machines certain gaming system functionality and features otherwise not associated with or available in association with the electronic gaming machines existing gaming establishment management systems.

In various embodiments, the player identification device receives reporting data communicated by an electronic gaming machine ("EGM") associated with an existing gaming establishment management system (i.e., a legacy or resident gaming establishment management system). The player identification device of these embodiments utilizes the received reporting data in conjunction with another gaming establishment management system (i.e., a non-legacy or non-resident gaming establishment management system) to provide one or more features or functions available by the non-legacy gaming establishment management system (and not available by the legacy gaming establishment management system). Accordingly, the player identification device disclosed herein functions as a gateway between an EGM and a non-legacy gaming establishment management system to provide the functionality of the non-legacy gaming establishment management system without requiring the gaming establishment operator to install such a non-legacy gaming establishment management system. Such a configuration thus provides that the player identification device disclosed herein is configured to operate with different EGMs manufactured by different EGM manufacturers to provide one or more features or functions regardless of the gaming establishment management system which the EGM is currently associated with or is otherwise currently employed by the gaming establishment operator.

Specifically, in certain embodiments, the player identification device is added to or otherwise replaces the magnetic striped card reader of a player tracking unit previously installed on an EGM or to be added to an EGM. The player identification device of these embodiments includes a magnetic striped card reader configured to identify the encoded information of a player tracking card associated with a legacy player tracking system of a legacy gaming establishment management system. The player identification device of these embodiments also includes a wireless communication interface utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol). The player identification device also includes a plurality of communication ports, such as multiple SAS protocol ports, wherein one SAS port receives data transmitted from an EGM processor and another SAS port communicates data regarding certain provided functionality or features to the EGM. The player identification device further includes an Ethernet port to connect with one or more components of a non-legacy gaming establishment management system as well as a display port to connect with one or more display devices or universal game adapters (which are configured to mix at least two video signals onto a single display device). It should be appreciated that including such ports and interfaces on an integrated circuit board as part of the player identification device enables the player identification device to provide one or more functions associated with different hardware components of different gaming establishment management systems. As such, to enable one or more of the below-described functions and features associated with one or more non-legacy gaming establishment management systems, in certain embodiments, a gaming establishment operator would need to install only the player identification device disclosed herein (and not need to install both the player identification device and such separate hardware components, such as a SMIB associated with the player identification device or any SMIBs associated with any functions provided by any non-legacy gaming establishment management systems).

In operation, the player identification device taps into or otherwise receives a SAS data feed of an EGM manufactured by any suitable EGM manufacturer utilizing a Slot Accounting System ("SAS") protocol or any other suitable EGM communication protocol. The player identification device of these embodiments listens to, monitors or otherwise captures the data the EGM sends to a component of a first gaming establishment management system, such as a legacy or resident Slot Machine Interface Board ("SMIB") of a legacy or resident player tracking unit (which then translates such game data to SAS data and communicates such SAS data to the first gaming establishment management system employed by the gaming establishment).

Utilizing such listened to or monitored data from the EGM, the player identification device operates with a second gaming establishment management system not fully employed by the gaming establishment to provide certain functionality or features available via the second gaming establishment management system (but not available via the first gaming establishment management system). That is, by tapping into a communication or data link between an EGM and a component of the legacy gaming establishment management system (e.g., a SMIB of the player tracking unit), the player identification device is configured to: (i) receive data generated by the EGM, such as game play data including coin-in, coin-out, game wins, and losses, and (ii) utilize such data, as explained below, to provide certain additional functionality not otherwise available to the EGM by the legacy gaming establishment management system. Such a configuration provides that the player identification device disclosed herein is independent of and, with the exception of communicating with an isolated component of the legacy gaming establishment management system, such as the SMIB of the player tracking unit, does not communicate with any other components of the legacy gaming establishment management systems, and thus the player identification device can be utilized in association with different manufacturer's EGMs associated with different manufacturer's gaming establishment management systems to provide additional functionality not otherwise associated with such existing gaming establishment management systems. Accordingly, the player identification devices disclosed herein provide a retrofit solution to gaming establishments with the need to provide additional functionality and features to players but with previously installed gaming establishment management systems that do not offer such functionality or features to players. Thus, instead of having to purchase and install relatively costly hardware of another gaming establishment management system to enable certain additional functionality or features (and endure the above-described hardships associated with such a purchase and installation), the player identification device disclosed herein represents the primary hardware necessary to be replaced or added to an EGM to enable such previously unavailable functionality or features.

In addition to tapping a communication line between the EGM and a component of the legacy gaming establishment management system (e.g., the SMIB of the legacy player tracking unit), in certain embodiments, the player identification device is connected to or otherwise placed in communication with one or more processors of the EGM. In one such embodiment, if the EGM includes at least two SAS ports, one of the EGM SAS ports (i.e., a SAS port not in communication with the SMIB of the existing player tracking unit which communicates data to a legacy gaming establishment management system) is connected to one of the SAS ports of the player identification device. In the alternative, if the EGM includes one SAS port which is already in communication with the SMIB of the existing player tracking unit (which communicates data to the legacy gaming establishment management system), the player identification device utilizes a universal game module which is configured to duplicate a SAS port of the EGM to provide dual SAS port functionality without interfering with the data communicated via the single SAS port.

In certain embodiments, while the player identification device includes a magnetic striped card or smart reader to determine when a player has physically inserted and/or removed a player tracking card, the player identification device alternatively utilizes the received data to determine certain events associated with the legacy player tracking system of the legacy gaming establishment management system. For example, if the player identification device determines that the received data includes or is associated with a SAS cashout event, the player identification device communicates to the resident SMIB such an event to log out or card out the player from the player tracking system. In another example, if the player identification device determines that the received data includes or is associated with a credit balance of zero credits (or a credit balance of zero credits for a designated period of time), the player identification device communicates to the resident SMIB such an event to log the player out of the player tracking system. Accordingly, these embodiments provide that without otherwise communicating with the EGM processor, the player identification device is configured to monitor received data for the occurrence of certain events and provide player tracking functionality compatible with legacy gaming establishment management systems.

In certain embodiments, the player identification device, is configured to provide certain features or functionality to an EGM, via the player identification device, that are not otherwise available via the legacy gaming establishment management system in communication with the EGM. In these embodiments, via the Ethernet port of the player identification device or via a suitable wireless communication protocol, the player identification device is connected to or otherwise in communication with each of one or more non-legacy gaming establishment management systems to facilitate or make available certain features or functionality offered by these non-legacy gaming establishment management systems (which are not offered by the legacy gaming establishment management system). It should be appreciated that when installed, the player identification device disclosed herein does not interfere with or otherwise obstruct the communication of data between the EGM and the legacy gaming establishment management system components. Rather, the player identification device is configured to monitor such data and provide, as described below, additional functionality to the EGM, via the installed player identification device.

In certain embodiments, the additional functionality provided, via the player identification device, by the non-legacy gaming establishment management system includes progressive award functionality. In these embodiments, the non-legacy gaming establishment management system maintains one or more progressive awards which are distinct from and not associated with any progressive awards maintained by the legacy gaming establishment management system. In operation of these embodiments, the player identification device monitors wagering data communicated from the EGM to the SMIB of the legacy player tracking unit and communicates this wagering data, such as via the Ethernet Port of the player identification device, to a progressive award server of a non-legacy establishment management system. The progressive award server of the non-legacy gaming establishment management system increments the maintained progressive awards based on this communicated wagering data. In these embodiments, upon a determination that a progressive award triggering event occurs, such as upon the player identification device or progressive award server of the non-legacy gaming establishment management system determining, via the monitored data, that a designated game outcome associated with a progressive award was generated during a play of a game, the non-legacy gaming establishment management system causes, via communicating data to the player identification device which in turn communicates data to the EGM, the progressive award to be provided to the player of the EGM. That is, the player identification device links a non-legacy gaming establishment management system maintained progressive award to an EGM associated with a non-progressive award enabled legacy gaming establishment management system to designate or otherwise configure the EGM to enable a progressive award to be won from the EGM associated with the legacy gaming establishment management system. It should be appreciated that in these embodiments, instead of having to add separate progressive award hardware of the non-legacy gaming establishment management system, such as a progressive award SMIB, to the EGM associated with the legacy gaming establishment management system to associate the EGM with the progressive award, the player identification device disclosed herein represents the primary hardware necessary to be replaced or added to the EGM to enable such previously unavailable progressive award functionality.

In certain embodiments, the additional functionality provided, via the player identification device, by the non-legacy gaming establishment management system additionally or alternatively includes mystery bonus award functionality. In operation of these embodiments, the player identification device monitors certain data communicated from the EGM to the SMIB of the legacy player tracking unit and communicates this data, such as via the Ethernet Port of the player identification device, to a mystery bonus award server of a non-legacy establishment management system. The mystery bonus award server of the non-legacy gaming establishment management system determines, at least based in part on the communicated data, if a mystery bonus award triggering event occurs. In these embodiments, upon a determination that a mystery bonus award triggering event occurs, such as upon the value of an accumulation pool incrementing to a randomly determined designated value or upon a randomly determined point in time, the non-legacy gaming establishment management system causes, via communicating data to the player identification device which in turn communicates data to the EGM, the mystery bonus award to be provided to the player of the EGM. That is, the player identification device links a non-legacy gaming establishment management system mystery bonus award to an EGM associated with a non-mystery bonus award enabled legacy gaming establishment management system to designate or otherwise configure the EGM to enable a mystery bonus award to be won from the EGM associated with the legacy gaming establishment management system. It should be appreciated that in these embodiments, instead of having to add separate mystery bonus award hardware of the non-legacy gaming establishment management system, such as mystery bonus award SMIB, to the EGM associated with the legacy gaming establishment management system to associate the EGM with the mystery bonus award, the player identification device disclosed herein represents the primary hardware necessary to be replaced or added to the EGM to enable such previously unavailable mystery bonus award functionality. It should be further appreciated that in these embodiments, at least due to the nature of providing a mystery bonus award to a player (i.e., an award provided without any apparent reason to the player), the display port of the player identification device is connected to or otherwise in communication with one or more display devices to display suitable information regarding such mystery bonus awards, such as an amount of the mystery bonus award and why such a mystery bonus award was provided. Such information may also be displayed by a player's mobile device via one or more applications executed by the player's mobile device.

In certain embodiments, the additional functionality provided, via the player identification device, by the non-legacy gaming establishment management system additionally or alternatively includes the facilitation of a transfer of funds to and from an EGM via a mobile device. In operation of these embodiments, the player identification device communicates, such as via the Ethernet Port of the player identification device or via a cellular network associated with the mobile device, with a cashless server of a non-legacy establishment management system to enable a player to establish a credit balance on an EGM and cashout the credit balance utilizing an application running on a mobile device (and without utilizing any physical forms of currency or physical ticket vouchers associated with any forms of currency). As such, the player identification device links a non-legacy gaming establishment management system cashless wagering server to an EGM associated with a legacy gaming establishment management system to utilize a mobile device as an interface of an electronic wallet or e-wallet to facilitate the transfer of funds, such as via the transfer of fund data, to and from the EGM. It should be appreciated that in these embodiments, instead of having to add separate cashless wagering system SMIB hardware of the non-legacy gaming establishment management system to the EGM associated with the legacy gaming establishment management system to enable such functionality, the player identification device disclosed herein represents the primary hardware necessary to be replaced or added to the EGM to enable such previously unavailable functionality.

Accordingly, the present disclosure provides for a player identification device to enable an EGM to offer certain features and functions otherwise not available to be offered via the resident or legacy gaming establishment management systems associated with the EGM. Such a solution thus enables certain gaming establishments to provide additional gaming establishment management system functionality or features without the associated relatively high costs or relatively long durations of EGM downtime associated with a complete replacement of the gaming establishment's resident or existing gaming establishment management systems.

Additional features and advantages are described herein, and will be apparent from the following Detailed Description and the figures.

DETAILED DESCRIPTION

Player Identification Device

In various embodiments, the player identification device receives reporting data communicated by an electronic gaming machine ("EGM") associated with an existing gaming establishment management system (i.e., a legacy or resident gaming establishment management system). The player identification device of these embodiments utilizes the received reporting data in conjunction with another gaming establishment management system (i.e., a non-legacy or non-resident gaming establishment management system) to provide one or more features or functions available by the non-legacy gaming establishment management system (and not available by the legacy gaming establishment management system). Accordingly, the player identification device disclosed herein functions as a gateway between an EGM and a non-legacy gaming establishment management system to provide the functionality of the non-legacy gaming establishment management system without requiring the gaming establishment operator to install such a non-legacy gaming establishment management system. Such a configuration thus provides that the player identification device disclosed herein is configured to operate with different EGMs manufactured by different EGM manufacturers to provide one or more features or functions regardless of the gaming establishment management system which the EGM is currently associated with or is otherwise currently employed by the gaming establishment operator.

Player Identification Device

Figure 1A:
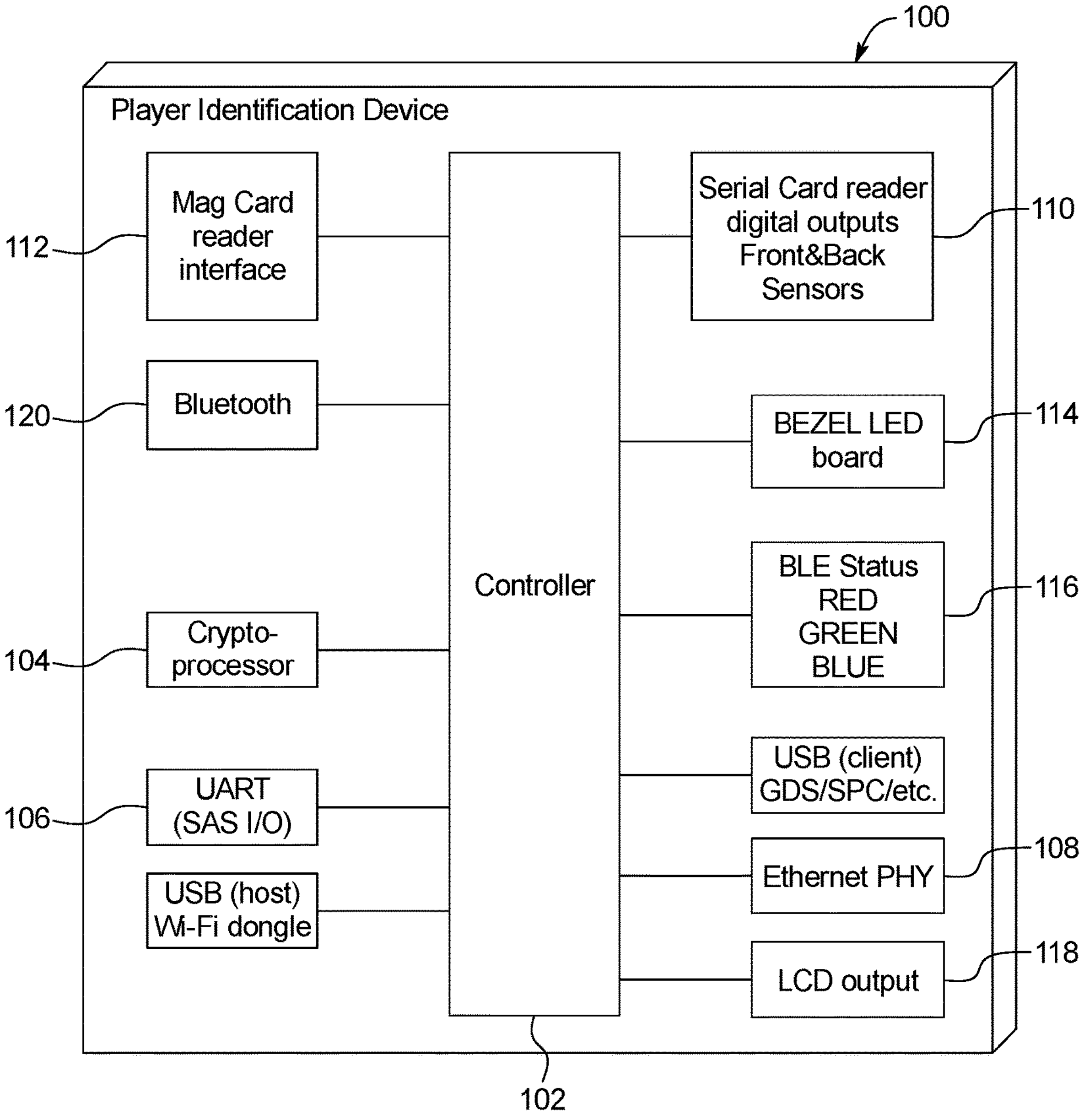
FIG. 1A is a schematic block diagram of one embodiment of an electronic configuration of an example player identification device disclosed herein.
Figure 1B:
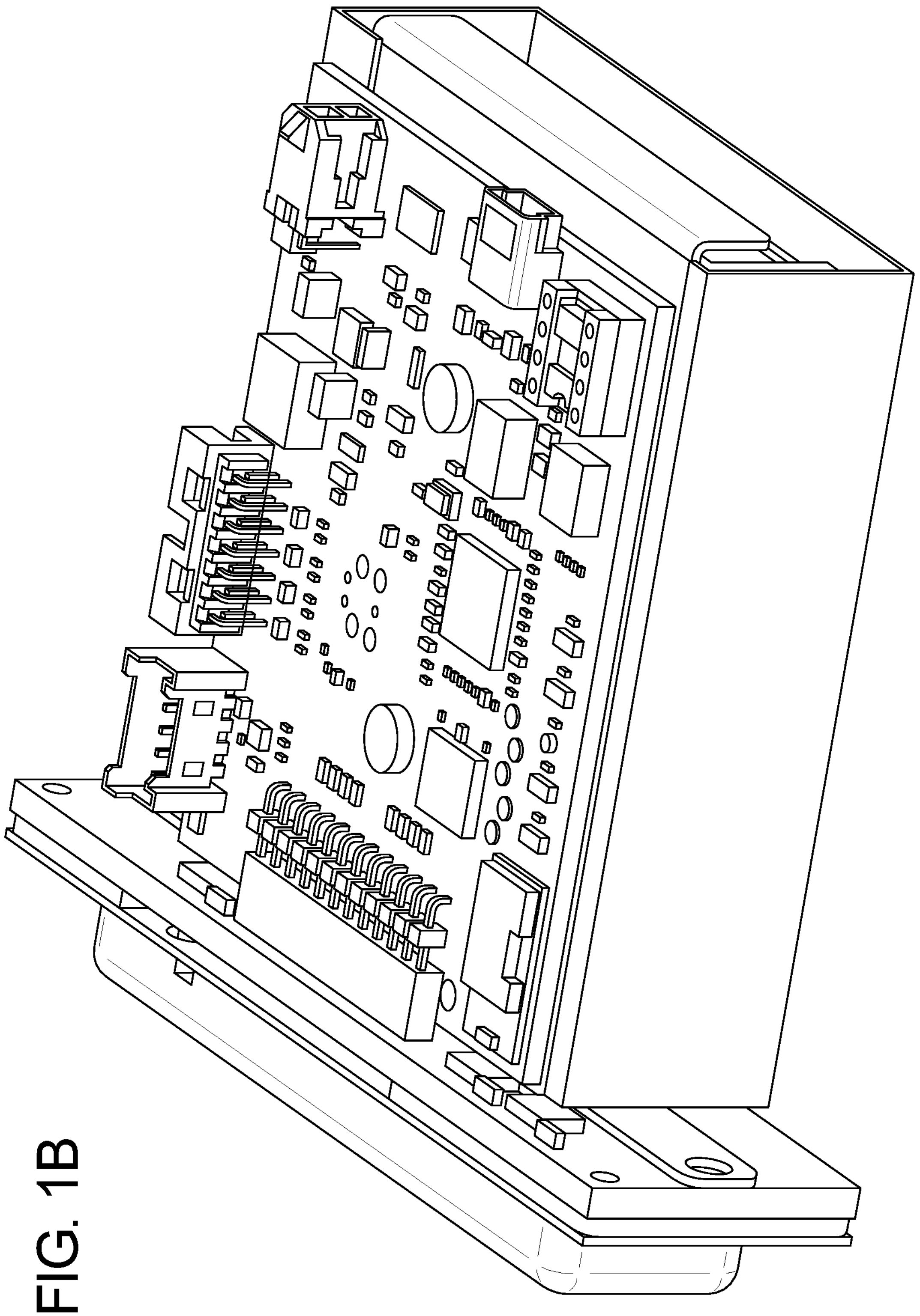
FIG. 1B is a perspective of one embodiment of the example player identification device disclosed herein.

With reference to FIGS. 1A and 1, in various embodiments, the player identification device 100 includes a support structure or body that provides support for a plurality of the below-described components of the player identification device. When installed in an EGM, the support structure or body is supported by the cabinet of the EGM and/or the housing of a legacy player tracking unit. As described in more detail below, the player identification device includes at least: (i) a player tracking card reader configured to read data associated with a player tracking card, (ii) a first SAS communication port configured to receive slot accounting system data communicated from an EGM processor to a SMIB of a player tracking unit associated with a resident gaming establishment management system, (iii) a communication port configured to communicate the received slot account system data to a non-resident gaming establishment management system and receive data associated with an event of the non-resident gaming establishment management system, (iv) a second SAS communication port configured to communicate data associated with the event of a non-resident gaming establishment management system to the EGM processor, (v) a wireless communication interface configured to wirelessly communicate with a mobile device, and (vi) a display port configured to cause one or more display devices to display information associated with the event of a non-resident gaming establishment management system. Such a player identification device is configured to replace the card readers of existing player tracking units to facilitate the offering of one or more of the below-described features or functions to a player at an EGM.

In certain embodiment, the player identification device includes at least one controller 102 configured to communicate with and to operate with a plurality of player identification device peripheral devices and interfaces. The controller 102 includes at least one processor. The at least one processor is any suitable processing device or set of processing devices, such as a microprocessor, a microcontroller-based platform, a suitable integrated circuit, or one or more application-specific integrated circuits configured to execute software enabling various configuration and reconfiguration tasks, such as: (1) communicating with a remote source (such as a server of a non-legacy gaming establishment management system) via a communication interface of the controller; (2) converting signals read by an interface to a format corresponding to that used by software or memory of the player identification device; (3) accessing memory to configure or reconfigure parameters in at least one memory; (4) communicating with interfaces and peripheral devices; and/or (5) controlling interfaces and peripheral devices.

The controller 102 also includes at least one memory device, which includes one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device. Any other suitable magnetic, optical, and/or semiconductor memory may operate in conjunction with the player identification device disclosed herein.

The at least one memory device is configured to store, for example: (1) configuration software; (2) communication protocols configured to enable the at least one processor of the player identification device to communicate with the player identification device peripheral devices and interfaces; and/or (3) communication transport protocols (such as, but not limited to, TCP/IP, USB, Firewire, IEEE1394, Bluetooth, BLE, IEEE 802.11x (IEEE 802.11 standards), hiperlan/2, HomeRF, etc.) configured to enable the player identification device to communicate with local and non-local devices using such protocols. In one implementation, the controller communicates with other devices using a serial communication protocol.

In certain embodiments, the at least one memory device is configured to store program code and instructions executable by the at least one processor of the player identification device to control the player identification device. In various embodiments, part or all of the program code and/or the operating data described herein is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) uses such a removable memory device to implement at least part of the present disclosure. In other embodiments, part or all of the program code and/or the operating data is downloaded to the at least one memory device of the player identification device through any suitable data network described above (such as an Internet or intranet).

The at least one memory device also stores a plurality of device drivers. Examples of different types of device drivers include device drivers for player identification device components and device drivers for the player identification device peripheral components. Typically, the device drivers utilize various communication protocols that enable communication with a particular physical device. The device driver abstracts the hardware implementation of that device. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the player identification device loads the new device driver from the at least one memory device to enable communication with the new device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. For example, when the at least one memory device uses flash memory or EPROM units configured to parameters, and settings, the software stored in the flash and/or EPROM memory units can be upgraded by replacing one or more memory units with new memory units that include the upgraded software.

In certain embodiments, the at least one memory device also stores authentication, validation and/or encryption components configured to authenticate/validate/encrypt specified information, such as hardware components, software components, firmware components, peripheral device components, user input device components, information received from one or more user input devices, and information stored in the at least one memory device. In certain other embodiments, the player identification device additionally or alternatively includes one or more authentication, validation and/or encryption processors, such as crypto-processor 104 of FIG. 1A, configured to authenticate/validate/encrypt specified information, such as hardware components, software components, firmware components, peripheral device components, user input device components, information received from one or more user input devices, and information stored in the at least one memory device.

In certain embodiments, the player identification device includes a plurality of different communication ports configured to enable the at least one processor of the controller to communicate and operate with external peripherals, such as various components of: an EGM, one or more legacy gaming establishment management systems and/or and one or more non-legacy gaming establishment management systems. It should be appreciated that any suitable communication device configured to communicate and operate with any component of any EGM, any mobile device, any legacy gaming establishment management system, and/or any non-legacy gaming establishment management system may be implemented in accordance with the player identification device disclosed herein.

In one such embodiment, the player identification includes at least two SAS communication ports 106 configured to communicate data, according to a SAS protocol, with the EGM over a communication or data link, such as an RS-232 link.

In these embodiments, a first SAS port is used to monitor data, according to the SAS protocol, from the EGM to the resident or legacy SMIB of the player tracking unit associated with the player tracking system of the legacy gaming establishment management system. Specifically, the first SAS port couples the player identification device to an EGM using the SAS communications protocol over a first communication or data link. This first communication or data link enables the player identification device to monitor, listen to or otherwise tap the SAS communication or data link occurring between the EGM and the resident player tracking unit SMIB (which then communicates such SAS data to one or more servers of the legacy gaming establishment management system associated with the EGM). By connecting to or otherwise being in communication with the EGM to tap or otherwise monitor the data communicated from the EGM to the resident or legacy SMIB, the player identification device is configured to: (i) receive data generated by the EGM, such as game play data including coin-in, coin-out, game wins, and losses, and (ii) utilize such data, as explained below, to provide certain additional functionality not otherwise available to the EGM.

In these embodiments, a second SAS port is used to communicate data, according to the SAS protocol, between the player identification device to the EGM. Specifically, the second SAS port couples the player identification device to the EGM using the SAS communications protocol over a second communication or data link. This second communication or data link enables the player identification device to communicate data, such as data received from one or more servers of one or more non-legacy gaming establishment management systems to the EGM. By establishing a line of communication with the EGM, the player identification device is configured to: (i) update the EGM upon the occurrence of certain events, such as any awards won in association with a non-legacy gaming establishment management system, and (ii) utilize the EGM, via the player identification device, to provide certain additional functionality not otherwise available to the EGM.

It should be appreciated that in certain embodiments, based on the quantity of SAS ports of the EGM, the player identification device utilizes a universal game module to provide additional SAS port functionality when no SAS port is available. In these embodiments, the player identification device utilizes the universal game module which is configured to duplicate a SAS port of the EGM to provide multi-SAS port functionality without interfering with the data communicated via the single SAS port.

In certain embodiments, the player identification device includes a communication port used to communicate with the legacy SMIB of the existing player tracking unit. In one such embodiment, the player identification device utilizes a sync-serial communication or data link to communicate to the legacy player tracking unit SMIB certain data regarding the identified player and zero, one or more monitored events pertaining to the legacy player tracking system.

In certain embodiments, the player identification device includes an Ethernet port 108 used to communicate with one or more servers of one or more non-legacy gaming establishment management systems over a Ethernet communication or data link.

In certain embodiments, the player identification device includes an display port used to communicate with one or more display devices. In certain of these embodiments, the display port couples the player identification device to one or more display devices associated with the EGM, such as a top-box display device or overhead display device associated with the EGM, over a communication or data link. In certain of these embodiments, the display port couples the player identification device to a universal game adapter (which are configured to mix at least two video signals onto a single display device), over a communication or data link. In these embodiments, the display device communication or data link enables the player identification device to cause the display of information pertaining to one or more events associated with one or more servers of one or more non-legacy gaming establishment management systems.

In certain embodiments, the peripheral devices and interfaces of the player identification device may include one or more of: (1) a serial card reader 110, (2) a magnetic striped card reader interface 112 configured to read a player identification card (including an encoded player identification number that uniquely identifies the player) inserted into the card reader, (3) at least one output device including a BEZEL LED board 114 configured to indicate if the card reader is in receipt of a magnetic striped card and/or a BLE status indicator 116 configured to indicate if a BLE communication link is established with another device, (4) at least one display device, such as an LCD output 118, (5) at least one wireless communication component, such as a BLE component or module 120, (6) at least one wired/wireless power distribution component (not shown) including components or devices that are configured to provide power to other devices, and (7) one or more USB peripherals to enable communication between the player identification device and any suitable peripheral device.

It should be appreciated that while illustrated as utilizing a BLE protocol (and including one or more components configured to indicate if a BLE communication link is established with another device), the wireless communication component of the player identification device is operable to implement any suitable wireless communication protocols including, but not limited to: Bluetooth™, one or more cellular communication standards (e.g., 3G, 4G, LTE), one or more Wi-Fi compatible standards, and one or more short range communication protocols (e.g., an NFC protocol). Such wireless communication components transmits electrical, electromagnetic, or optical signals that carry digital data streams or analog signals representing various types of information.

It should be further appreciated that while the player identification device disclosed herein is configured to, as described below, identify a player via a card reader or via a mobile device and establish a connection between an EGM and one or more non-legacy gaming establishment management systems to offer one or more features or functions not available via a legacy gaming establishment management system, the player identification device does not, in certain embodiments, replace the existing components of a player tracking unit. That is, as seen in at least FIG. 2A, the player identification device disclosed herein does not include nor replace existing player tracking unit components such as one or more display devices 202 configured to display the player's name and balance of player tracking points, one or more input devices 204, such as a touch screen or keypad configured to enable the player to enter a Personal Identification Number, and/or the player tracking unit SMIB 206 which is connected to an EGM controller and receives game data from the EGM, translates the game data to SAS data and transmits the SAS data to the legacy gaming establishment management system 210. As such, while the player identification device disclosed herein replaces the card reader of an existing player tracking unit, certain components of the existing player tracking unit remain to timely track any suitable information or data relating to an identified player's gaming session such as any amounts wagered, average wager amounts, and/or the time at which these wagers are placed and utilize such data in association with the existing or legacy player tracking system.

Utilizing Player Identification Device to Identify Player Activities

In certain embodiments, while the player identification device disclosed herein replaces the card reader of an existing player tracking unit of an EGM, because the EGM does not communicate certain events to the player identification device, the player identification device needs alternative ways to track the activity at the EGM and determine when certain events occur. That is, since the player identification device of certain embodiments disclosed herein represents a retrofit solution (to enable certain system functionality) and does not otherwise modify the configuration of the EGM to communicate data to the player identification device, the player identification device monitors certain EGM data feeds to determine if and when certain events occur.

Figure 2A:
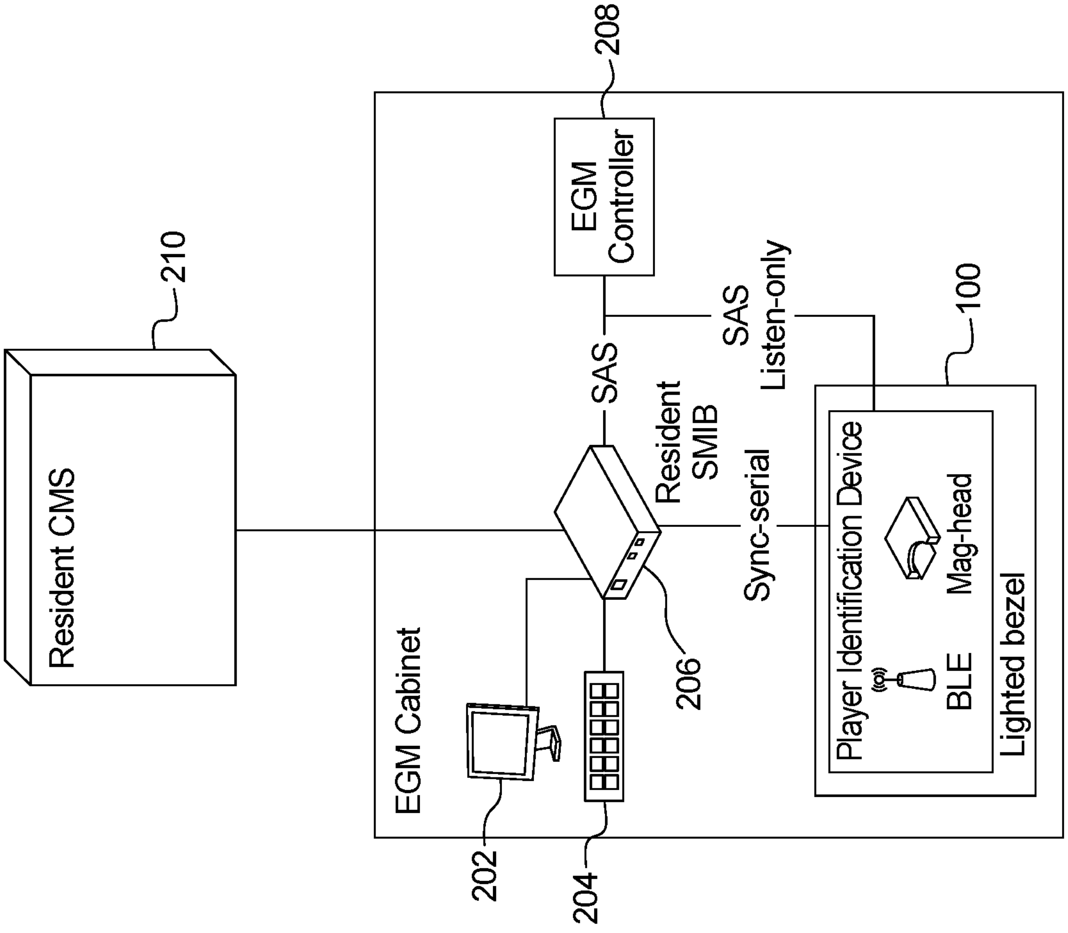
FIGS. 2A, 2B, 2C, 2D, 2E and 2F are example configurations of the player identification device disclosed herein in relation to an EGM, one or more legacy gaming establishment management systems and one or more non-legacy gaming establishment management systems.

In these embodiments, as illustrated in FIG. 2A, the player identification device 100 connects to, taps or is otherwise in communication with the communication or data link between the EGM and the existing or resident SMIB of the existing or resident player tracking unit. Establishing such a listen-only communication line enables the player identification device to monitor, view or otherwise capture the data, such as game play data including coin-in, coin-out, game wins, and losses, the EGM sends to the existing or resident SMIB of the existing or resident player tracking unit. In these embodiments, when installed, the player identification device does not interfere with or otherwise obstruct the communication of data between the legacy EGM, the legacy SMIB of the legacy player tracking unit and the legacy gaming establishment management system components.

In certain embodiments, while the player identification device includes various sensors to determine when a player tracking card has been inserted and removed from the card reader (and thus the player identification device can determine when a player's gaming session has begun and ended and can communicate such data to the resident SMIB of the resident player tracking unit), in certain situations, the player identification device relies on the above-described captured data to determine one or more events of the player's gaming session. In certain other embodiments, while the player identification device utilizes the wireless interface implementing a wireless communication protocol to facilitate the insertion and/or removal of an electronic player tracking card, the player identification device can determine when a player's gaming session has begun and ended and can communicate such data to the resident SMIB of the resident player tracking unit, in certain situations, the player identification device relies on the above-described captured data to determine one or more events of the player's gaming session.

In one such situation, when a player has logged into a player tracking account without inserting a player tracking card into the card reader of the player identification device (such as the player utilizing the resident input device of the resident player tracking unit), the player identification device monitors the above-described captured data to determine one or more events associated with the termination of the player's gaming session.

In one embodiment, the player identification device determines if the EGM reports to the resident SMIB that a cashout device of the EGM, such as a cashout button, has been actuated. In this embodiment, based on reporting of this SAS cashout event, the player identification device communicates data to the legacy SMIB to inform the legacy SMIB that a card-out event occurred. In another embodiment, if the player identification device determines that the monitored data includes or is associated with a credit balance of zero credits (or a credit balance of zero credits for a designated period of time). In this embodiment, based on the monitoring of the credit balance, the player identification device communicates data to the legacy SMIB to inform the legacy SMIB that a card-out event occurred. In another embodiment, the player identification device monitors the communicated data for one or more game start and/or game end events. In this embodiment, based on the monitoring of these events, the player identification device communicates data to the legacy SMIB to inform the legacy SMIB that a card-out event occurred. It should be appreciated that by monitoring any suitable SAS event, the player identification device disclosed herein is operable to determine card-in and card-out events to identify different player's gaming sessions in accordance with the legacy player tracking unit and player tracking system. Accordingly, these embodiments provide that without otherwise communicating with the EGM processor, the player identification device is configured to monitor received data for the occurrence of certain events and provide player tracking functionality compatible with legacy gaming establishment management systems.

Utilizing Player Identification Device to Provide Progressive Award Functionality In certain embodiments, in addition to providing certain player tracking functionality (e.g., card-in and/or card-out detection) compatible with legacy gaming establishment management systems, the player identification device disclosed herein is configured to facilitate certain progressive award features or functionality that are not otherwise available via the legacy gaming establishment management system in communication with the EGM.

Figure 2B:
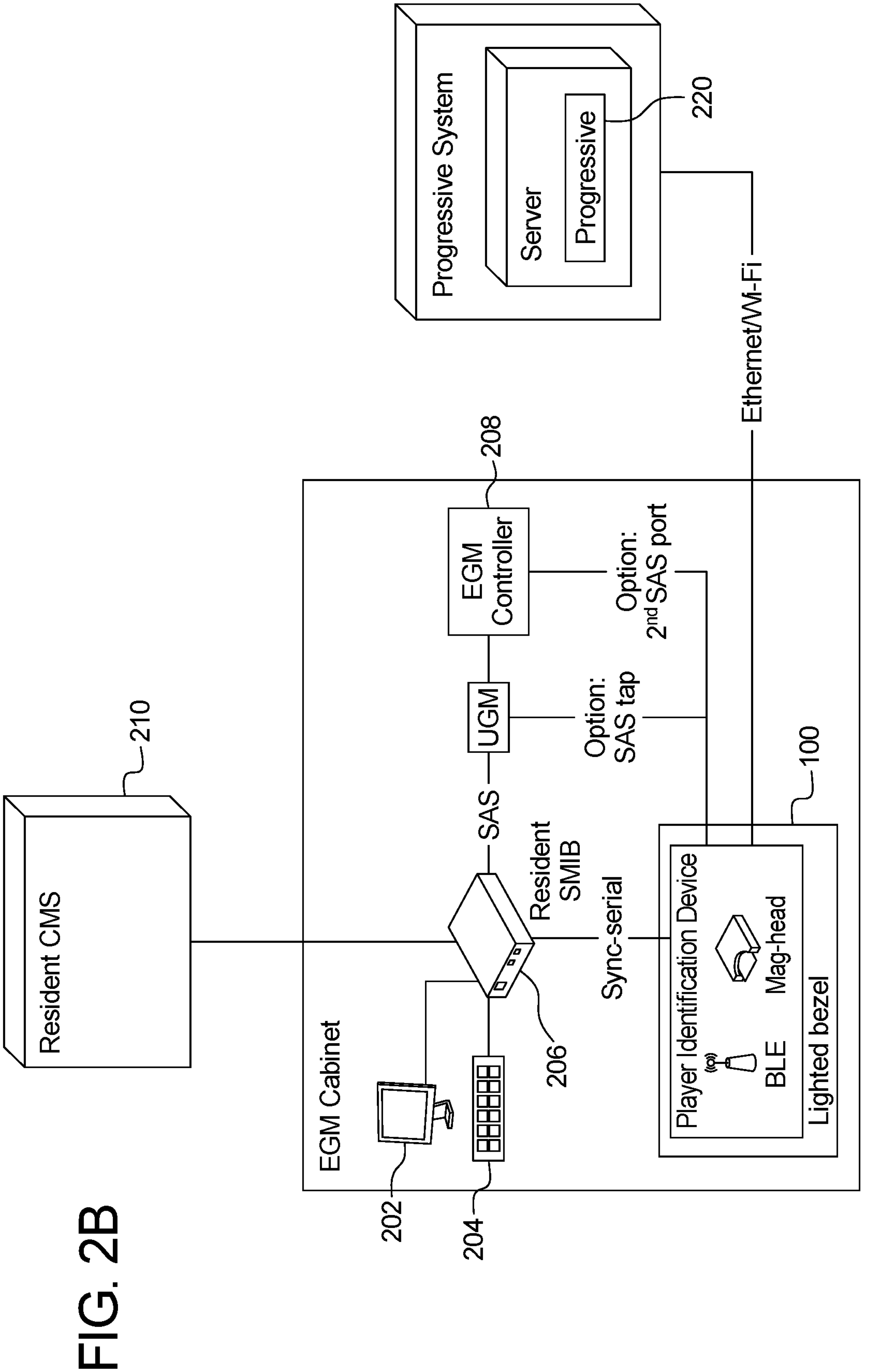

In one such embodiment, as seen in FIG. 2B, via the Ethernet port of the player identification device, the player identification device is connected to or otherwise in communication with one or more progressive award servers 220 of a non-legacy gaming establishment management system. In another such embodiment, via a wireless communication protocol, the player identification device is connected to or otherwise in communication with one or more progressive award servers of a non-legacy gaming establishment management system.

In these embodiments, in addition to the player identification device being in communication with one or more progressive award servers of a non-legacy gaming establishment management system, via the second SAS port of the player identification device, the player identification device is coupled to or otherwise placed in communication with the EGM. In one such embodiment, the player identification device utilizes a second SAS port of the EGM to establish this communication or data link. In another such embodiment wherein the EGM lacks a second SAS port, the player identification device utilizes a universal game module ("UGM") to duplicate the functionality of the SAS port of the EGM to establish this communication or data link. In these embodiments, this communication or data link enables the player identification device to communicate data to the EGM regarding the below-described progressive awards maintained by the one or more progressive award servers of the non-legacy gaming establishment management system. For example, this communication or data link enables the player identification device to inform the EGM of the value of a progressive award, a change in value of the progressive award, a payout of the progressive award, and/or a reset of the value of the progressive award (following a payout of the progressive award), whereby the EGM utilizes such information to display one or more aspects of the progressive award to the player.

In these embodiments, the non-legacy gaming establishment management system (and specifically one or more progressive award servers of the non-legacy gaming establishment management system) maintains one or more progressive awards which are distinct from and not associated with any progressive awards maintained by the legacy gaming establishment management system. In one form, each progressive award is an award amount which includes an initial amount and an additional amount funded through a portion of each wager made on the EGM associated, via the player identification device, with the progressive award. For example, 0.1% of each wager placed on a play of a primary game of the EGM associated, via the player identification device, with the progressive award may be allocated to the progressive award or progressive award fund or pool.

In these embodiments, each maintained progressive award may be associated, via the player identification device, with or otherwise dedicated to a single or stand-alone EGM. Alternatively, a progressive award may be associated, via the player identification device, with or otherwise dedicated to multiple EGMs which each contribute a portion of wagers placed at such EGMs to the progressive award. The multiple EGMs may be local area progressive awards in the same bank of EGMs or in the same gaming establishment (usually through a local area network ("LAN")) or may be wide area progressive awards in two or more different gaming establishments (usually through a wide area network ("WAN")).

In certain embodiments, an EGM or a bank of EGMs may be simultaneously associated, via the player identification device, with a plurality of progressive awards. In these multi-level progressive ("MLP") configurations, a plurality of progressive awards start at different award or value levels, such as $10, $100, $1000 and $10,000 and each individually increment or increase until provided to a player.

In operation of these embodiments, the player identification device monitors, via the above-described tapped EGM-to-SMIB communication or data link, game play data communicated from the EGM to the SMIB of the legacy player tracking unit. The player identification device further communicates this monitored game play data, via the established player identification device-to-progressive award server communication or data link, to the progressive award server of the non-legacy establishment management system. The progressive award server increments the maintained progressive award(s) based on this communicated game play data, such as any communicated wagering data.

In these embodiments, upon a determination that a progressive award triggering event occurs, such as upon the progressive award server determining, via the monitored data, that a designated game outcome associated with a progressive award was generated during a play of a game, the progressive award server determines that the player of the EGM has won the maintained progressive award. Following this determination, the progressive award server communicates, via the established player identification device-to-progressive award server communication or data link, progressive award payout data to the player identification device. The player identification device then communicates, via the established player-identification device-to-EGM communication or data link, this progressive award payout data to the EGM. Upon receipt of this progressive award payout data, the EGM (or one or more components of the legacy gaming establishment management system) cause the progressive award to be provided to the player. As such, the player identification device links a non-legacy gaming establishment management system maintained progressive award to an EGM associated with a non-progressive award enabled legacy gaming establishment management system to designate or otherwise configure the EGM to enable the progressive award to be won from the EGM associated with the legacy gaming establishment management system. It should be appreciated that in these embodiments, instead of having to add separate hardware of the non-legacy gaming establishment management system (e.g., a progressive award SMIB) to the EGM associated with the legacy gaming establishment management system to associate the EGM with the progressive award, the player identification device disclosed herein represents the primary hardware necessary to be replaced or added to the EGM to enable such previously unavailable progressive award functionality.

Utilizing Player Identification Device to Provide Mystery Award Functionality

In certain embodiments, in addition to providing certain player tracking functionality (e.g., card-in and/or card-out detection) compatible with legacy gaming establishment management systems, the player identification device disclosed herein is additionally or alternatively configured to facilitate certain mystery award features or functionality that are not otherwise available via the legacy gaming establishment management system in communication with the EGM.

Figure 2C:
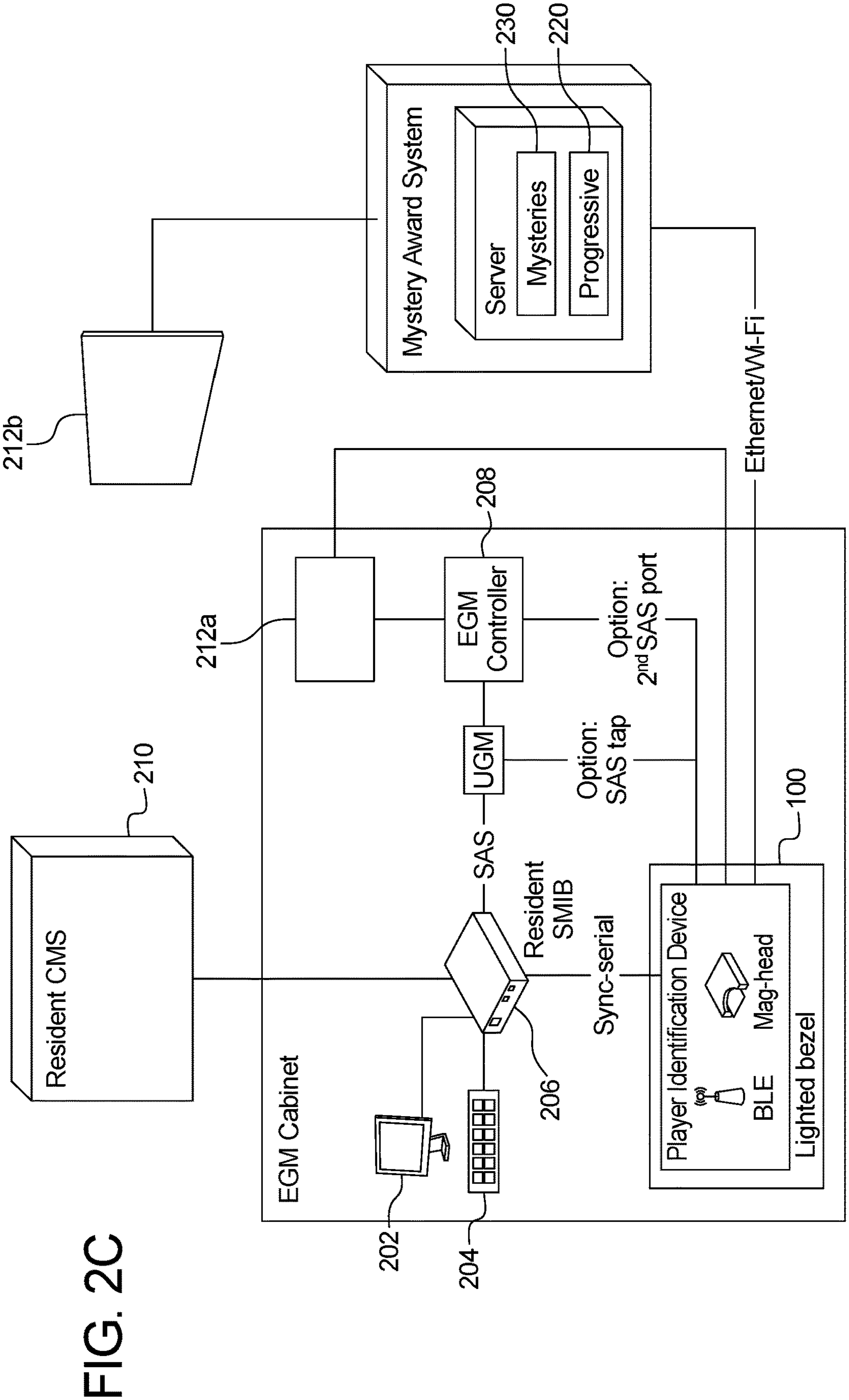

In one such embodiment, as seen in FIG. 2C, via the Ethernet port of the player identification device, the player identification device is connected to or otherwise in communication with one or more mystery award servers 230 of a non-legacy gaming establishment management system. In another such embodiment, via a wireless communication protocol, the player identification device is connected to or otherwise in communication with one or more mystery award servers of a non-legacy gaming establishment management system.

In these embodiments, in addition to the player identification device being in communication with one or more mystery award servers of a non-legacy gaming establishment management system, via the second SAS port of the player identification device, the player identification device is coupled to or otherwise placed in communication with the EGM. In one such embodiment, the player identification device utilizes a second SAS port of the EGM to establish this communication or data link. In another such embodiment wherein the EGM lacks a second SAS port, the player identification device utilizes a UGM to duplicate the functionality of the SAS port of the EGM to establish this communication or data link. In these embodiments, this communication or data link enables the player identification device to communicate data to the EGM regarding the below-described mystery awards maintained by the one or more mystery award servers of the non-legacy gaming establishment management system. For example, this communication or data link enables the player identification device to inform the EGM of a payout of a mystery award whereby the EGM utilizes such information to display one or more aspects of the mystery bonus award to the player.

It should be appreciated that in certain of these embodiments, at least due to the nature of providing a mystery bonus award to a player (i.e., an award provided without any apparent reason to the player), the display port of the player identification device is connected to or otherwise in communication with one or more display devices to display suitable information regarding such mystery bonus awards, such as an amount of the mystery bonus award and why such a mystery bonus award was provided.

As such, in certain of these embodiments, in addition to the above-described communication or data links, the display port of the player identification device communicates with one or more display devices 212 to display information associated with such mystery awards. In such embodiments, the display port couples the player identification device, over an established communication or data link, to one or more display devices associated with the EGM, such as a top-box display device or overhead display device associated with the EGM.

In certain others of these embodiments, in addition to the above-described communication or data links, the display port of the player identification device communicates with a universal game adapter housing in the EGM (which is configured to mix at least two video signals onto a single display device) to display information associated with such mystery awards. Such information may be displayed utilizing the universal game adapter via an in-game secondary display and/or via a picture-in-picture display. In such embodiments, the display port couples the player identification device to the universal game adapter, over an established communication or data link, to display mystery award information via one or more display devices associated with the EGM, such as a top-box display device or overhead display device associated with the EGM.

In operation of these embodiments, the player identification device monitors, via the above-described tapped EGM-to-SMIB communication or data link, game play data communicated from the EGM to the SMIB of the legacy player tracking unit. The player identification device further communicates this monitored game play data, via the established player identification device-to-mystery award server communication or data link, to the mystery award server of the non-legacy establishment management system.

In these embodiments, upon a determination from the mystery award server that a mystery award triggering event occurs, such as upon an amount of monitored coin-in reaching or exceeding a designated amount of coin-in, the mystery award server determines that the player of the EGM has won a mystery award. Following this determination, the mystery award server communicates, via the established player identification device-to-mystery award server communication or data link, mystery award payout data to the player identification device. The player identification device then communicates, via the established player-identification device-to-EGM communication or data link, this mystery award payout data to the EGM. Upon receipt of this mystery award payout data, the EGM (or one or more components of the legacy gaming establishment management system) cause the mystery award to be provided to the player. As such, the player identification device links a non-legacy gaming establishment management system mystery award to an EGM associated with a non-mystery bonus award enabled legacy gaming establishment management system to designate or otherwise configure the EGM to enable the mystery award to be won from the EGM associated with the legacy gaming establishment management system. It should be appreciated that in these embodiments, instead of having to add separate hardware of the non-legacy gaming establishment management system (e.g., a mystery bonus award SMIB) to the EGM associated with the legacy gaming establishment management system to associate the EGM with the mystery award, the player identification device disclosed herein represents the primary hardware necessary to be replaced or added to the EGM to enable such previously unavailable mystery bonus award functionality.

Utilizing Player Identification Device to Provide Externally Controlled Interface Functionality In certain embodiments, in addition to providing certain player tracking functionality (e.g., card-in and/or card-out detection) compatible with legacy gaming establishment management systems, the player identification device disclosed herein is additionally or alternatively configured to facilitate certain externally controller interface features or functionality that are not otherwise available via the legacy gaming establishment management system in communication with the EGM. In different embodiments, as described in more detail below, the functions or features enabled via the externally controlled interface provided, via the player identification device, from the content management server of the non-legacy gaming establishment management system include, but are not limited to: a virtual Automatic Teller Machine which enables the EGM to provide fund transfers and monetary account management, a virtual entertainment center which enables the EGM to provide one or more entertainment services besides game play, a virtual lottery machine that enables a player to purchase a lottery ticket of some sort at the EGM, a virtual sports book that enables a player to make a wager on an event at the EGM, to monitor events, to receive results and to cash out a winning event ticket, a virtual communication center that enables a player to communicate with other game players, other individuals or a gaming establishment host, send and receive e-messages and/or c) locate other players, a virtual concierge that enables a player to learn about and obtain various hotel/gaming establishment, restaurant, entertainment and travel services and make reservations, a virtual vending machine that enables a player to purchase various vending items at the EGM and a virtual kiosk that enables for registration services such as for a loyalty program and comping and prize redemption associated with a loyalty program.

Figure 2D:
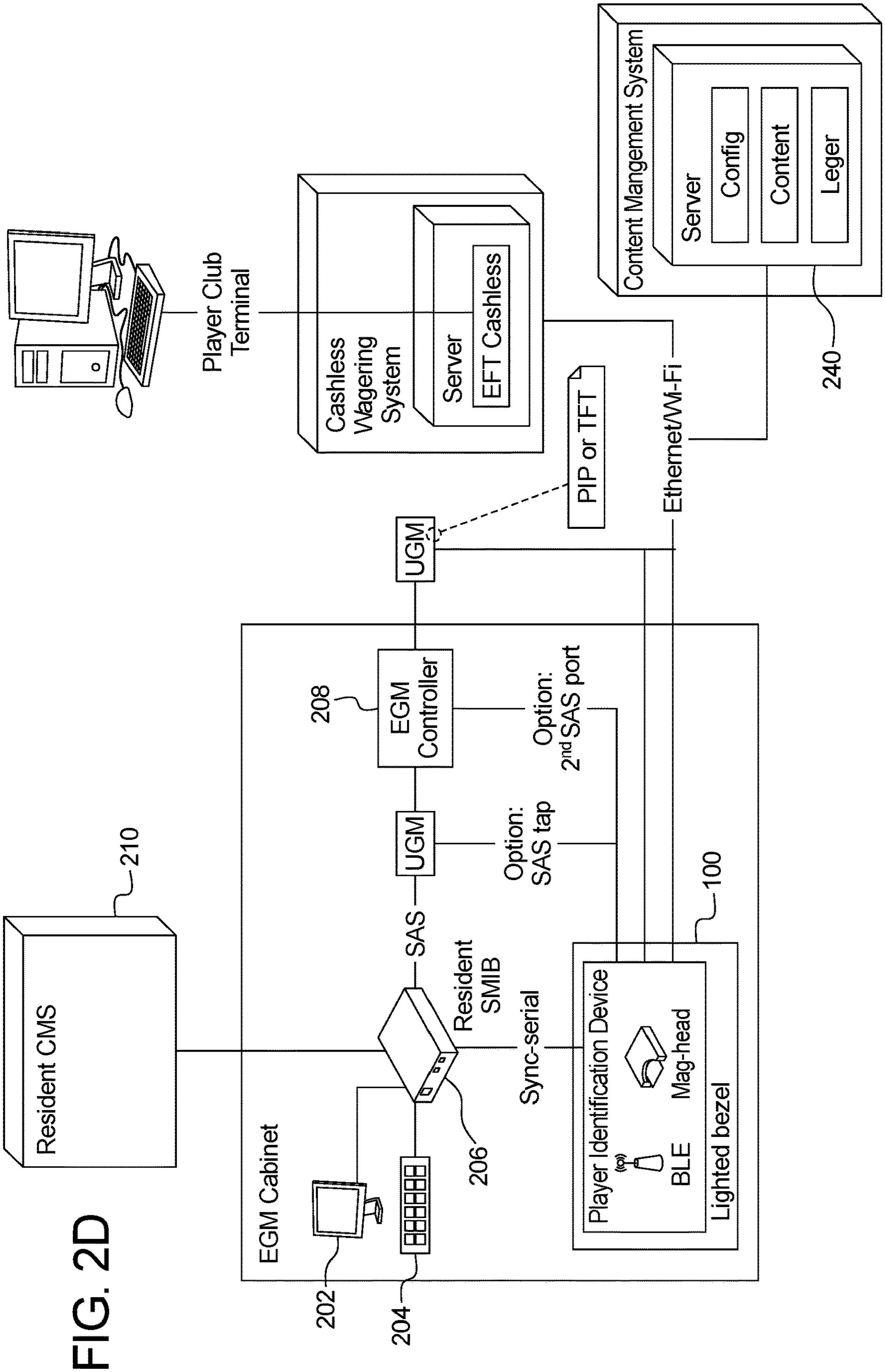

In one such embodiment, as seen in FIG. 2D, via a HTTPS port or an WSS port of the player identification device, the player identification device is connected to or otherwise in communication with one or more content management servers 240 of a non-legacy gaming establishment management system. In another such embodiment, via a wireless communication protocol, the player identification device is connected to or otherwise in communication with one or more content management servers of a non-legacy gaming establishment management system.

In these embodiments, in addition to the player identification device being in communication with one or more content management servers of a non-legacy gaming establishment management system, via the second SAS port of the player identification device, the player identification device is coupled to or otherwise placed in communication with the EGM. In one such embodiment, the player identification device utilizes a second SAS port of the EGM to establish this communication or data link. In another such embodiment wherein the EGM lacks a second SAS port, the player identification device utilizes a UGM to duplicate the functionality of the SAS port of the EGM to establish this communication or data link. In these embodiments, this communication or data link enables the player identification device to communicate data to the EGM regarding the below-described externally controlled interfaces provided by the content management servers of the non-legacy gaming establishment management system. For example, this communication or data link enables the player identification device to inform the EGM of any feature or function associated with an externally controlled interface executed by the content management server.

In certain embodiments, in addition to the above-described communication or data links, the display port of the player identification device communicates with a universal game adapter housed in the EGM (which is configured to mix at least two video signals onto a single EGM display device) to display information associated with such externally controlled interfaces. Such information may be displayed utilizing the universal game adapter via an in-game secondary display and/or via a picture-in-picture display.

In operation of these embodiments, the player identification device monitors, via the above-described tapped EGM-to-SMIB communication or data link, game play data communicated from the EGM to the SMIB of the legacy player tracking unit. The player identification device further communicates this monitored game play data, via the established player identification device-to-content management server communication or data link, to the content management server of the non-legacy establishment management system.

In these embodiments, upon a determination from the content management server that an externally controlled interface triggering event occurs, such as upon the player requesting such an externally controller interface, the content management server determines to cause the EGM, via the player identification device, to display one or more externally controller interfaces. In different embodiments, the externally controller interface triggering event occurs upon the monitored data pertaining to one or more of: a deposit of credits on the EGM, information being read from a portable instrument carried by a player (e.g., a mobile device, RFID tag or other wireless device), an actuation of a button, such as a mechanical button or a touch screen button, an event triggered from a play of the game, a cash-out command detected on the EGM, an input of a wager, an initiation of a game, a number of credits available on the EGM, one or more results of one or more games, a generation of one or more symbols, a designated win amount, and/or a player cashing out available credits. In another embodiment, an event generated on the content management server causes an externally controlled interface triggering event to occur.

Following this determination, the content management server communicates, via the established player identification device-to-content management server communication or data link, data associated with an externally controlled interface to the player identification device. The player identification device then communicates, via the established player-identification device-to-EGM communication or data link, this externally controlled interface data to the EGM. Upon receipt of this externally controlled interface data, the EGM utilizes the universal game adapter to display on the EGM, such as in a service window or picture-in-picture format, the externally controlled interface.

As such, the player identification device links a non-legacy gaming establishment management system content management server to an EGM associated with a non-externally controlled interface enabled legacy gaming establishment management system to designate or otherwise configure the EGM to enable externally controlled interfaces. It should be appreciated that in these embodiments, instead of having to add separate hardware of the non-legacy gaming establishment management system (e.g., an externally controller interface SMIB) to the EGM associated with the legacy gaming establishment management system to associate the EGM with such additional features and functionality, the player identification device disclosed herein represents the predominate hardware necessary to be replaced or added to the EGM to enable such previously unavailable functionality.

In certain embodiments, the services provided to the player via the externally controlled interface may include, but are not limited to one or more of: enabling a player to order food, drinks or coffee from the EGM (possibly to be delivered to the player at the EGM), enabling a player at a EGM to communicate with a person at another EGM, enabling a person at a EGM to communicate with a gaming establishment concierge, enabling a player to learn information about various hotels, gaming establishments, restaurants, entertainment and/or travel services, enabling a player to make reservations, such as at a restaurant or for an event, from the EGM, enabling a player to transfer funds or manage a monetary account from the EGM, enabling a player to purchase a lottery ticket at the EGM, enabling a player to obtain change at a EGM, enabling a player to make a wager on an event or other unknown outcome, such as a sporting event, to monitor events, to receive results and to cash out a winning event ticket at the EGM, enabling a player to send and receive electronic messages, such as e-mails, at the EGM, enabling a player to purchase various vending items at the EGM, enabling a player to access internet enabled services, enabling a player to check and redeem player tracking points for merchandise, entertainment or services, enabling a player to receive information related to upcoming tournaments or other gaming establishment promotions, enabling a player to watch television or a movie at the EGM, enabling a player to listen to music at the EGM, enabling a player to access the player's gaming establishment account, and enabling a player to view promotions available to that player.

In certain embodiments, one or more functions or features provided to the player via the externally controlled interface may include, but are not limited to one or more of: displaying information relating to one or more aspects of the player's gaming experience, providing personalized audio and/or video content at the EGM, enabling a player to pick a game to play from a plurality of available games, enabling a player to place one or more side-bets, enabling a player to play for one or more progressive awards (which may be different from or the same as the above-described progressive awards maintained by the progressive award server), enabling a player to participate in a gaming tournament, enabling a player to customize one or more aspects of the content displayed on a display device, enabling a player to customize one or more aspects of an interface, enabling a player to play a plurality of games simultaneously or substantially simultaneously at the EGM, enabling a player to access personal settings at the EGM, enabling a player to access a score card of accomplished events (such as which poker game outcomes has the player obtained and which poker game outcomes has the player not yet obtained), enabling a player to access a tournament leader board, and enabling a player to select a favorite type of award to play for.

In certain embodiments, one or more outcomes provided to the player via the externally controlled interface may include, but are not limited to one or more of: a value, a modifier, an entry in an award drawing, an entry in a tournament, a session surprise award, a modifier of any primary game awards for a set amount of time, a number of free or discounted spins or activations of a game, a prize, a progressive award which may be different from or the same as the above-described progressive awards maintained by the progressive award server), a retrigger to be utilized in a game, a wild symbol to be utilized in a game, a book-end wild symbols feature, a stacked wild symbols feature, an expanding wild symbols feature, an anti-terminator symbol feature, a locking reel feature, a locking symbol position feature, a feature modifying a number of wagered on paylines, a feature modifying a wager placed on one or more paylines (or on one or more designated paylines), a feature modifying a number of ways to win wagered on, a feature modifying a wager placed on one or more ways to win (or on one or more designated ways to win), a feature modifying a paytable utilized for a play of a game, a feature modifying an average expected payback percentage of a play of a game, a feature modifying an average expected payout of a play of a game, a feature modifying one or more awards available, a feature modifying a range of awards available, a feature modifying a type of awards available, a feature modifying an activation of a reel (or a designated reel), a feature modifying an activation of a plurality of reels, a feature modifying a generated outcome (or a designated generated outcome), a feature modifying a generated outcome (or a designated generated outcome) associated with an award over a designated value, a feature modifying a generated outcome (or a designated generated outcome) on a designated payline, a feature modifying a generated outcome (or a designated generated outcome) in a scatter configuration, a feature modifying a winning way to win (or a designated winning way to win), a feature modifying a designated symbol or symbol combination, a feature modifying a generation of a designated symbol or symbol combination on a designated payline, a feature modifying a generation of a designated symbol or symbol combination in a scatter configuration, a feature modifying a quantity of picks in a selection game, a feature modifying a quantity of offers in an offer and acceptance game, a feature modifying a quantity of moves, a feature modifying a game terminating or ending condition, a feature modifying a player's avatar, a bonus or secondary game, a nudge of one or more reels in a reel game, a hold of one or more reels in a reel game, a scatter type pay, one or more additional paylines in a reel game, one or more additional ways to win in a reel game, one or more additional ways to trigger a secondary game, one or more available promotions, one or more surveys, and one or more non-redeemable credits.

Progressive Award Triggering Events, Mystery Award Triggering Events and Externally Controlled Interface Triggering Events In different embodiments, a progressive award triggering event and/or an externally controlled interface triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the non-legacy gaming establishment management system does not provide any apparent reasons to the players for an occurrence of a progressive award triggering event, a mystery award triggering event and/or an externally controlled interface triggering event. In these embodiments, such determinations are not triggered by an event in a primary game or based specifically on any of the plays of any primary games. That is, these events occur without any explanation or alternatively with simple explanations.

In one such embodiment, a progressive award triggering event, a mystery award triggering event and/or an externally controlled interface triggering event occurs based on an amount of coin-in. In this embodiment, the non-legacy gaming establishment management system determines if an amount of coin-in reaches or exceeds a designated amount of coin-in (i.e., a threshold coin-in amount). Upon the amount of coin-in wagered reaching or exceeding the threshold coin-in amount, the non-legacy gaming establishment management system causes one or more of such events or conditions to occur. In another such embodiment, a progressive award triggering event, a mystery award triggering event and/or an externally controlled interface triggering event occurs based on an amount of virtual currency-in. In this embodiment, the non-legacy gaming establishment management system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the non-legacy gaming establishment management system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a progressive award triggering event, a mystery award triggering event and/or an externally controlled interface triggering event occurs based on an amount of coin-out. In this embodiment, the non-legacy gaming establishment management system determines if an amount of coin-out reaches or exceeds a designated amount of coin-out (i.e., a threshold coin-out amount). Upon the amount of coin-out reaching or exceeding the threshold coin-out amount, the non-legacy gaming establishment management system causes one or more of such events or conditions to occur. In another such embodiment, a progressive award triggering event, a mystery award triggering event and/or an externally controlled interface triggering event occurs based on an amount of virtual currency-out. In this embodiment, the non-legacy gaming establishment management system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the non-legacy gaming establishment management system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a progressive award triggering event, a mystery award triggering event and/or an externally controlled interface triggering event occurs based on a predefined variable reaching a defined parameter threshold. In different embodiments, the predefined parameter thresholds include a length of time, a length of time after a certain dollar amount is hit, a wager level threshold for a specific device, a number of EGMs active, or any other parameter that defines a suitable threshold.

In different embodiments, a progressive award triggering event, a mystery award triggering event and/or an externally controlled interface triggering event occurs based on a quantity of games played. In this embodiment, a quantity of games played is set for when one or more of such events or conditions will occur. In one embodiment, such a set quantity of games played is based on historic data.

In different embodiments, a progressive award triggering event, a mystery award triggering event and/or an externally controlled interface triggering event occurs based on time. In this embodiment, a time is set for when one or more of such events or conditions will occur. In one embodiment, such a set time is based on historic data.

In different embodiments, a progressive award triggering event, a mystery award triggering event and/or an externally controlled interface triggering event occurs based upon a non-legacy gaming establishment management system operator defined player eligibility parameters. In this embodiment, the parameters for eligibility are defined by the non-legacy gaming establishment management system operator based on any suitable criterion. In one embodiment, the non-legacy gaming establishment management system recognizes the player's identification, and determines if a status of the current player defined by the non-legacy gaming establishment management system operator is eligible for one or more of such events or conditions. In one embodiment, the non-legacy gaming establishment management system operator defines minimum bet levels required for such events or conditions to occur based on the player's card level.

In different embodiments, a progressive award triggering event, a mystery award triggering event and/or an externally controlled interface triggering event occurs based on a system determination, including one or more random selections by the non-legacy gaming establishment management system. In one embodiment, as described above, the non-legacy gaming establishment management system tracks all active EGMs and the wagers they placed. In one such embodiment, based on the EGM's state as well as one or more wager pools associated with the EGM, the non-legacy gaming establishment management system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a progressive award triggering event, a mystery award triggering event and/or an externally controlled interface triggering event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a progressive award triggering event, a mystery award triggering event and/or an externally controlled interface triggering event to occur may be implemented in accordance with the non-legacy gaming establishment management system and method disclosed herein.

It should be appreciated that one or more of the above-described triggers pertaining to a progressive award triggering event, a mystery award triggering event and/or an externally controlled interface triggering event occurring may be combined in one or more different embodiments.

It should be further appreciated that in certain embodiments, the player identification device disclosed herein is operable to provide such progressive award functionality, such mystery bonus award functionality and/or such externally controlled interface functionality with or without identifying the player at the EGM. As such, in these embodiments, the functionality of the player identification device disclosed herein is implemented with a player interaction device which communicates with one or more components of a non-legacy gaming establishment management system to offer to a player at an EGM certain features and functions not available with the legacy gaming establishment management system associated with the EGM.

Utilizing Player Identification Device to Provide Cashless and Ticketless Functionality In certain embodiments, in addition to providing certain player tracking functionality (e.g., card-in and/or card-out detection) compatible with legacy gaming establishment management systems, the player identification device disclosed herein is additionally or alternatively configured to facilitate certain mobile device enabled cardless features that are not otherwise available via the legacy gaming establishment management system in communication with the EGM.

Figure 2E:
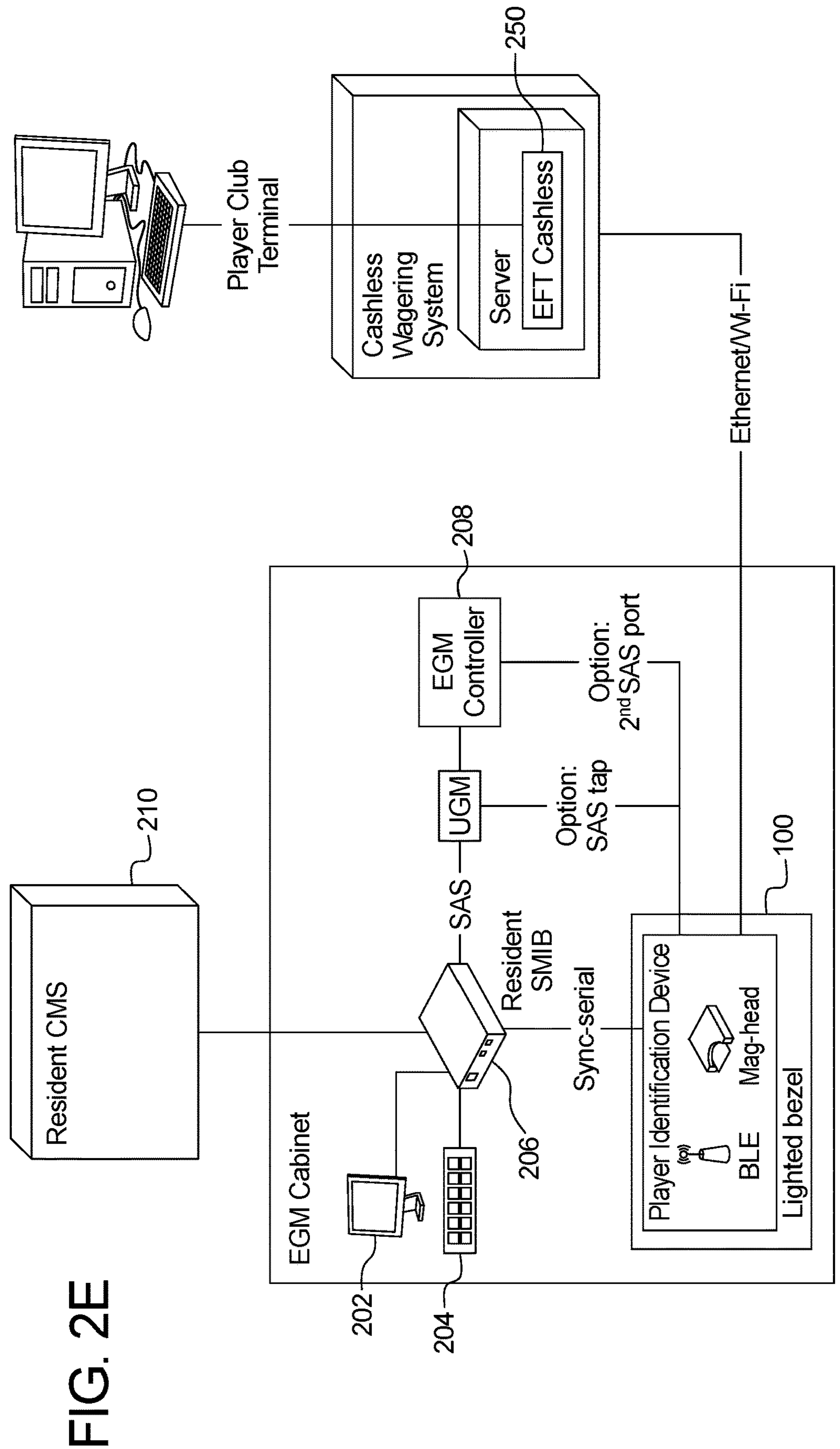
Figure 2F:
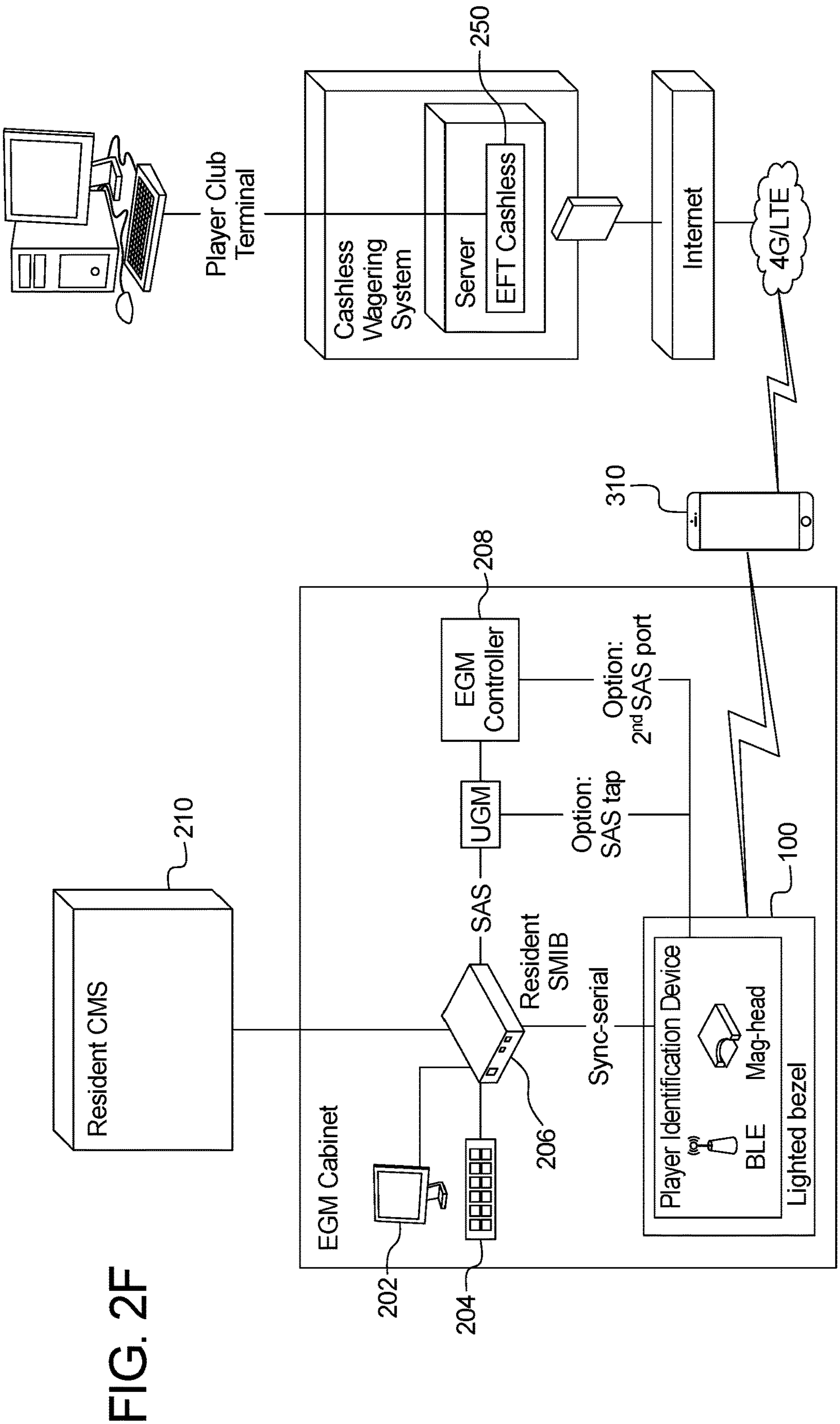

In one such embodiment, as seen in FIG. 2E, via the Ethernet port of the player identification device, the player identification device is connected to or otherwise in communication with one or more cashless wagering servers 250 of a non-legacy gaming establishment management system. In another such embodiment, via a wireless communication protocol, the player identification device is connected to or otherwise in communication with one or more cashless wagering servers of a non-legacy gaming establishment management system. In another such embodiment, as seen in FIG. 2F, via a cellular network of a mobile device, the player identification device is connected to or otherwise in communication with one or more cashless wagering servers 250 of a non-legacy gaming establishment management system. In this embodiment, the player identification device communicates data or messages to the mobile device and the mobile device acts as an intermediary between the player identification device and the cashless wagering servers of the non-legacy gaming establishment management system.

In these embodiments, in addition to the player identification device being in communication with one or more cashless wagering servers of a non-legacy gaming establishment management system, via the second SAS port of the player identification device, the player identification device is coupled to or otherwise placed in communication with the EGM. In one such embodiment, the player identification device utilizes a second SAS port of the EGM to establish this communication or data link. In another such embodiment wherein the EGM lacks a second SAS port, the player identification device utilizes a UGM to duplicate the functionality of the SAS port of the EGM to establish this communication or data link. In these embodiments, this communication or data link enables the player identification device to communicate data to the EGM regarding the below-described cashless wagering features facilitated by the non-legacy gaming establishment management system.

In operation of these embodiments, the player identification device utilizes these communication or data links to, as described below, pair a mobile device with the player identification device and facilitate the transfer of funds to and from an EGM via a mobile device. As such, the player identification device links a non-legacy gaming establishment management system without such mobile device facilitated fund transfer capabilities to an EGM associated with a legacy gaming establishment management system to designate or otherwise configure the EGM to offer such mobile device facilitated fund transfer capabilities. It should be appreciated that in these embodiments, instead of having to add separate hardware of the non-legacy gaming establishment management system (e.g., a cashless wagering system SMIB) to the EGM associated with the legacy gaming establishment management system to associate the EGM such mobile device facilitated fund transfer capabilities, the player identification device disclosed herein represents the predominate hardware necessary to be replaced or added to the EGM to enable such previously unavailable mobile device facilitated fund transfer capabilities.

Linking Mobile Device to Player Identification Device

In various embodiments, prior to enabling a player to take any action related to the gaming system (such as initiating a transfer of any funds to and from a mobile device to an EGM), a pairing or linkage occurs between the mobile device and the player identification device. The pairing or linkage between the mobile device and the player identification device occurs via one or more applications being run or executed on the mobile device.

In various embodiments, the mobile device application is a location based digital wallet enabled application, such as a Passbook-enabled or Wallet-enabled application, which is accessible when the player enters a gaming establishment. In certain embodiments, the mobile device application is downloaded to the mobile device from an application store. In certain embodiments, the mobile device application is downloaded to the mobile device from one or more websites affiliated with the gaming establishment (which are accessible directly by the player and/or by a link opened when the player scans a QR code associated with the player identification device).

In certain embodiments, after a player has opened an application on a mobile device and selected an action to be performed, the system (e.g., one or more components of the non-legacy gaming establishment management system) determines if the mobile device application is associated with an active authorization token previously created. In these embodiments, an authorization token is a time-based token which expires after a designated period of time and which is associated with an additional level of player authentication beyond a player's application username and application password.

If the system determines that the application is not associated with an active authorization token previously created, the mobile device application prompts the player to provide identifying information, such as a personal identification number or biometric identifier. The mobile device application stores the provided identifying information as mobile device encrypted data. Following the player providing identifying information, the mobile device application prompts the player to cause the mobile device to engage the player identification device, such as prompting the player to tap the mobile device to a designated portion of the EGM where the player identification device is located. It should be appreciated that any reference herein to a player tapping the mobile device to the player identification device may or may not include the player pressing a fingerprint scanner (if the mobile device is equipped with such a fingerprint scanner) while concurrently engaging the player identification device. In other embodiments, the mobile device application verifies the identifying information of the player by communicating with a verification/authentication server over one or more wireless communication protocols, such as WiFi protocol, a cellular communication protocol (e.g., 3G or LTE), to obtain the active authorization token.

In certain embodiments, following the player causing the mobile device to engage the player identification device, the mobile device application communicates, via a wireless communication protocol, the provided identifying information and the requested action to be performed to the non-legacy gaming establishment management system. For example, upon the player tapping the mobile device to the player identification device (or otherwise moving the mobile device to within a designated distance of the player identification device), the mobile device application sends the identifying information and the requested action to a component of the non-legacy gaming establishment management system.

Following the communication of the identifying information and the requested action to the non-legacy gaming establishment management system, the system determines if the identifying information is valid. For example, a designated gaming system component configured to operate with a non-legacy player tracking system determines whether the identifying information is valid.

It should be appreciated that in certain embodiments, since the player identification device operates with certain of the existing components of a legacy player tracking unit associated with a legacy player tracking system, it is necessary to set up cashless wagering accounts for certain players whom are not previously associated with such accounts via the non-legacy gaming establishment management system. In one such embodiment, one or more player kiosks or terminals are utilized to set up such accounts in association with the non-legacy gaming establishment management system. In another such embodiment, the ability to set up such accounts in association with the non-legacy gaming establishment management system is integrated into the legacy gaming establishment management system. In another embodiment, the ability to set up such accounts in association with the non-legacy gaming establishment management system is a feature of the mobile device application. In another embodiment, the mobile device application creates a restricted, anonymous player account in the non-legacy gaming establishment management system. Such a restricted player account is associated with a maximum balance to comply with certain money laundering laws. In this embodiment, since the identification of the player remains anonymous, the functionality of the player identification device disclosed herein is implemented with a player interaction device which identifies the restricted account associated with the anonymous player, but which may or may not identify the player.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the player to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the player to press the fingerprint scanner while engaging the player identification device.

On the other hand, if the system determines that the identifying information is valid, the system creates an authorization token. The system associates the authorization token with a timestamp of when the authorization token will expire. In certain embodiments, a cashless ticketing system of the non-legacy gaming establishment management system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the player identification device facilitated transfer of fund data between the EGM and the mobile device. Such a designated amount of time which an authorization token remains valid enables the player to move from one EGM to another EGM and, as described below, transfer funds to/from each EGM and a cashless wagering account, without having to reprovide such identifying information each time the player switches EGMs. That is, the mobile device application disclosed herein is configured to communicate with one or more player identification devices of one or more EGMs (without having to reauthenticate itself repeatedly) during the designated amount of time which the authorization token remains value.

Following the creation of an authorization token, the system communicates the created authorization token to the mobile device, such as via one or more messages including the created authorization token, for storage by the mobile device application and proceeds with executing the below-described requested action and communicating a requested action response to the mobile device. For example, upon the creation of the authorization token, the player identification device, communicates the created authorization token to the mobile device and proceeds with executing the requested action.

On the other hand, following a determination that the mobile device application is associated with a previously created and stored authentication token, the mobile device application prompts the player to cause the mobile device to engage the player identification device.

Following the player causing the mobile device to engage the player identification device, the mobile device application communicates, via a wireless communication protocol, the previously stored authorization token and the requested action to be performed to the player identification device. For example, upon the player tapping the mobile device to the player identification device, the mobile device application sends the stored authorization token and the requested action.

Following the communication of the stored authorization token and the requested action, the player identification device communicates, via the established communication or data link, data to the non-legacy gaming establishment management system. The non-legacy gaming establishment management system determines if the communicated authorization token is still valid (i.e., active and non-expired).

If the system determines that the communication authorization token is invalid, the system communicates an invalid authorization token response to the mobile device. The mobile device application then displays one or more messages regarding the invalid authorization token and prompts the player to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the player identification device proceeds with executing or facilitating the requested action and communicates a requested action response to the mobile device.

In certain embodiments, the system enables a player to interact with the player identification device via the mobile device as described herein, without having to continually reengage the player identification device with the mobile device for each requested action. In these embodiments, after initially establishing a secure connection with the player identification device, subsequent interactions between the mobile device application and the player identification device occur without any subsequent physical interaction between the mobile device and the player identification device. That is, to avoid having the player retrieve the mobile device and repeat the physical operation of engaging the player identification device with the mobile device, certain embodiments enable the player to execute one or more functions without repeating the above-described physical operation of engaging the player identification device with the mobile device. In certain such embodiments, via the above-described communication or data link between the player identification device and the EGM, the mobile device application utilizes one or more display devices of the EGM to display to the player information and/or player selectable prompts which are otherwise displayable via the display device of the mobile device.

In certain other embodiments, for each interaction or requested action described herein, the system requires the player to reengage the player identification device with the mobile device to reestablish or confirm the pairing between the player identification device and the mobile device. In certain other embodiments, for each interaction between the player identification device and the mobile device that occur a designated amount of time after the last engagement of the player identification device with the mobile device, the system requires the player to reengage the player identification device with the mobile device to reestablish or confirm the pairing between the player identification device and the mobile device.

Utilizing Paired Mobile Device Application at EGM

As described above, in various embodiments, after pairing the mobile device with the player identification device, the mobile device application communicates one or more requested actions to be performed to the player identification device. As described below, such requested actions generally pertain to an action associated with a player account, an action associated with an initiation of a transfer of monetary funds or an action associated with a transfer of promotional credits. It should be appreciated that while certain data or information pertaining to one or more of the below-described requested actions are communicated from a player identification device to a mobile device, such data or information may additionally or alternatively be communicated: (i) from one or more servers to a mobile device via one or more wireless communication protocols, or (ii) from a player identification device to one or more servers via one or more wireless communication protocols and then from one or more servers to a mobile device via one or more wireless communication protocols.

It should be further appreciated that any functionality or process described herein may be implemented via one or more servers (of the non-legacy gaming establishment management system and/or of the legacy gaming establishment management system), the player identification device, an EGM or a mobile device application. For example, while certain data or information described herein is explained as being communicated from a player identification device to a mobile device via one or more wireless communication protocols, such data or information may additionally or alternatively be communicated from one or more servers to a mobile device via one or more wireless communication protocols. Accordingly: (i) while certain functions, features or processes are described herein as being performed by an EGM, such functions, features or processes may alternatively be performed by one or more servers or one or more mobile device applications or the player identification device, (ii) while certain functions, features or processes are described herein as being performed by one or more mobile device applications, such functions, features or processes may alternatively be performed by one or more servers or one or more EGMs or the player identification device, (iii) while certain functions, features or processes are described herein as being performed by one or more servers, such functions, features or processes may alternatively be performed by one or more EGMs or one or more mobile device applications or the player identification device, and (iv) while certain functions, features or processes are described herein as being performed by the player identification device, such functions, features or processes may alternatively be performed by one or more EGMs or one or more mobile device applications or one or more servers.

Player Accounts

Figure 3A:
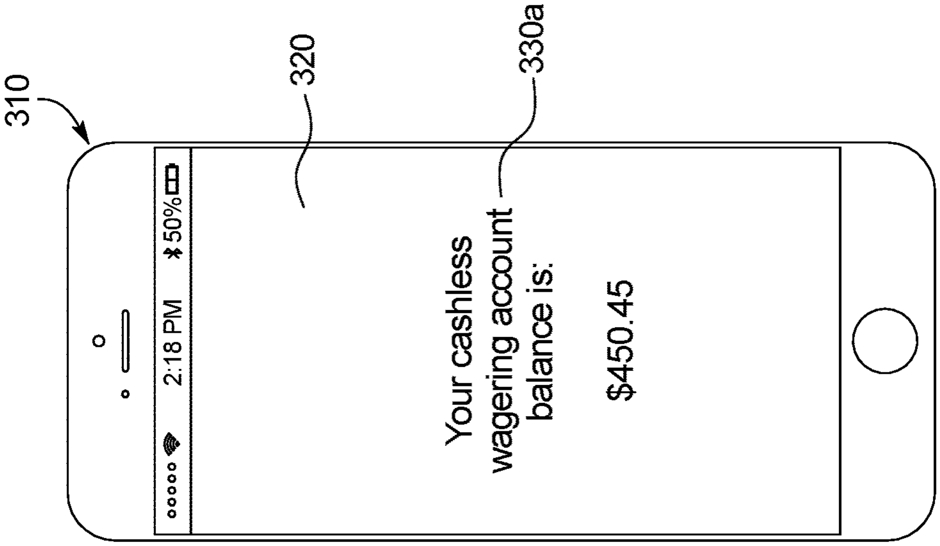
FIGS. 3A, 3B, 3C, 3D, and 3E are example graphical user interfaces displayed on a mobile device in connection with actions initiated at a mobile device and completed at an EGM.

In certain embodiments, the action to be performed includes enabling the player to log into a cashless wagering account, via a wireless communication protocol, utilizing the mobile device application. In certain such embodiments, following the launching of the mobile device application, such as following the player selecting an image associated with an electronic wagering account card stored via a digital wallet application or following the mobile device application retrieving data associated with a cashless wagering account stored via a digital wallet application, the mobile device application prompts the player to cause the mobile device to engage the player identification device. After such engagement (or after the launching of the mobile device application if no mobile device to player identification device engagement is required), the mobile device application communicates, via a wireless communication protocol, player cashless wagering account data stored by the mobile device to the player identification device. The player identification device proceeds with operating with a cashless wagering system of the non-legacy gaming establishment management system to log the player into a cashless wagering account associated with the player. In one embodiment, the system determines a balance of the cashless wagering account associated with the player and causes the player identification device to communicate, via one or more wireless communication protocols, the determined cashless wagering account balance to the mobile device. In another embodiment, the system determines a balance of the cashless wagering account associated with the player and communicates, via one or more wireless communication protocols, the determined cashless wagering account balance to the mobile device. For example, as seen in FIG. 3A, the mobile device application 320 of the mobile device 310 proceeds with displaying the determined cashless wagering account balance to the player 330*a*.

Figure 3B:
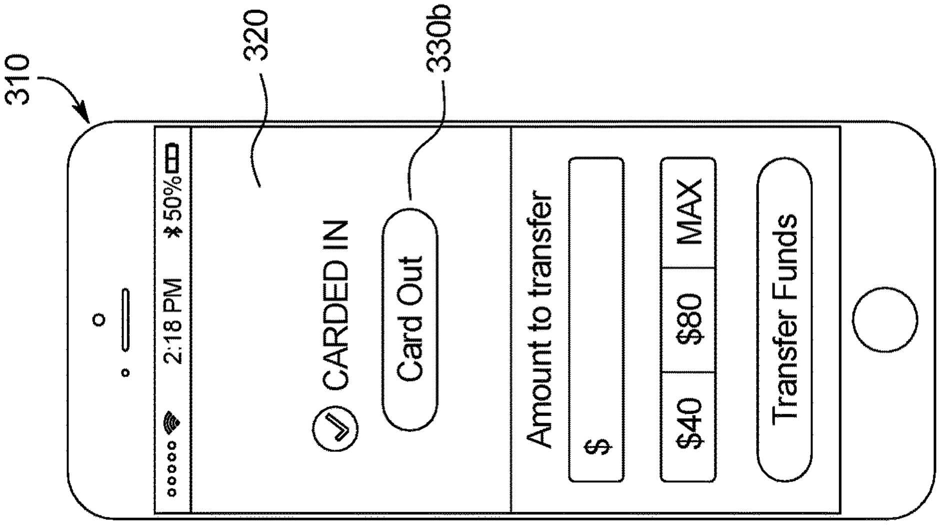

In certain embodiments, the action to be performed additionally or alternatively includes enabling the player to log out of a cashless wagering account of the non-legacy gaming establishment management system, via a wireless communication protocol, utilizing the mobile device application. In certain embodiments, the player identification device proceeds with operating with the non-legacy gaming establishment management system to log the player out of the cashless wagering account. For example, as seen in FIG. 3B, the mobile device application 320 of the mobile device 310 proceeds with displaying an icon 330*b* which enables the player to log out of the cashless wagering account. In different embodiments, upon the player identification device monitoring, as described above, the EGM to resident SMIB communication regarding a "cash out" input from the player, if the player identification device determines that no activity has occurred for a designated amount of time, or if the player identification device determines that another player is attempting to log onto the player identification device, the mobile device application facilitates a logging out of the player's cashless wagering account.

Monetary Fund Transfers

In certain embodiments, the action to be performed additionally or alternatively includes enabling the player to facilitate the transfer of funds from a cashless wagering account to the EGM utilizing the mobile device application and the player identification device. In certain such embodiments, following the launching of the mobile device application, the mobile device application determines an amount of funds to be transferred from the cashless wagering account to the EGM.

In certain embodiments, the cashless wagering account is associated with one or more external accounts, such as one or more credit card accounts, one or more debit card accounts and/or one or more third-party maintained accounts (i.e., one or more PayPal® accounts). In certain embodiments, the cashless wagering account is associated with a gaming establishment or a group of gaming establishments, wherein the player establishes a cashless wagering account by a deposit of funds (such as at a kiosk as described below) to be subsequently utilized in association with the mobile device application.

In certain embodiments, the non-legacy gaming establishment management system includes an automatic reload feature wherein if a cashless wagering account falls below a threshold level, the non-legacy gaming establishment management system automatically transfers an amount from the external account and/or the gaming establishment account to the cashless wagering account. It should be appreciated that, in certain embodiments, the gaming system enables the player to enable or disable such an automatic reload feature.

Figure 3C:
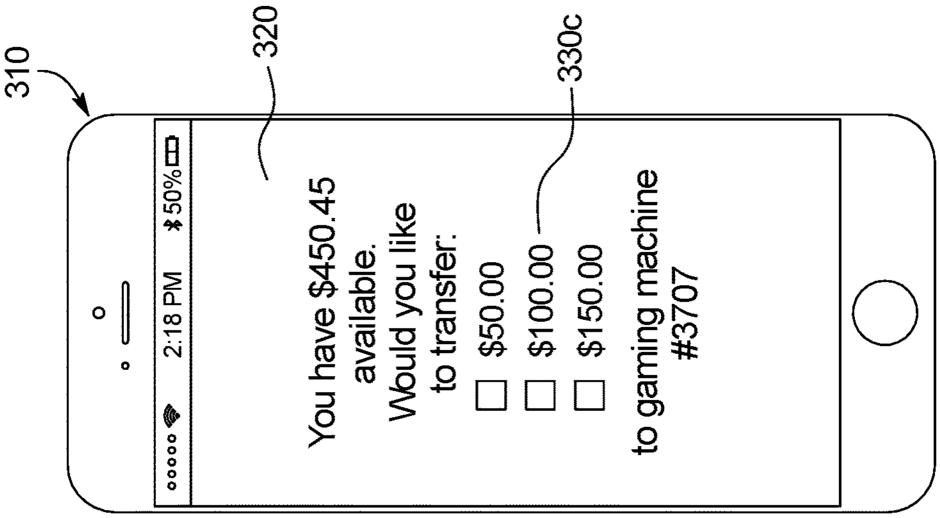

In one embodiment, the mobile device application enables the player to select an amount to be transferred from a listing of available amounts of funds to be transferred from the cashless wagering account to the EGM. For example, as seen in FIG. 3C, the mobile device application 320 of the mobile device 310 proceeds with displaying a listing of available, selectable amounts to be transferred from the cashless wagering account to the EGM 330*c* via the player identification device.

In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the EGM, such as based on the denomination, game type, minimum bet and/or maximum available wager amount of the EGM. In a first example, if the EGM is a collection of $1 poker games, then the listing of available amounts displayed are $40, $80, $120. In a second example, if the EGM is a penny slots game, then the listing of available amounts displayed are $20, $40, $60.

In one embodiment, the mobile device application includes more than one listing of available amounts of funds to be transferred. In this embodiment, the mobile device application includes one listing of available amounts for an initial transfer of funds to the EGM for a gaming session (i.e., a first listing of amounts to initially establish a credit balance of an EGM) and another listing of available amounts for a subsequent transfer of funds to the EGM for an existing gaming session (i.e., a second listing of amounts to modify a previously established credit balance of the EGM).

In another embodiment, the mobile device application determines a default amount of funds to be transferred from the cashless wagering account to the EGM via the player identification device. In one such embodiment, the default amount of funds includes the last amount of funds transferred from the cashless wagering account to the EGM. In another such embodiment, the default amount of funds includes the last amount of funds transferred from the EGM to the cashless wagering account. The mobile device application displays to the player such a default amount of funds to be transferred.

In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's credit balance, or the player's status.

In one embodiment, the mobile device application includes more than one default amount of funds to be transferred. In this embodiment, the mobile device application includes one default amount for an initial transfer of funds to the EGM for a gaming session (i.e., a first default amount to initially establish a credit balance of an EGM) and another default amount for a subsequent transfer of funds to the EGM for an existing gaming session (i.e., a second default amount to modify a previously established credit balance of the EGM).

In certain embodiments, following the determination of an amount of funds to be transferred from the cashless wagering account to the EGM, the mobile device application prompts the player to cause the mobile device to engage the player identification device. For example, as seen in FIG. 3D, the mobile device application 320 of the mobile device 310 proceeds with prompting the player to cause the mobile device to engage the player identification device.

After such engagement (or after the determination of an amount of funds to be transferred if no mobile device to player identification device engagement is required), the mobile device application communicates, via a wireless communication protocol, data associated with the determined amount of funds to be transferred from the cashless wagering account to the player identification device. The player identification device proceeds with operating with a cashless wagering system of the non-legacy gaming establishment management system to log the player into a cashless wagering account associated with the player and request the determined amount of funds to be transferred from the cashless wagering account to the EGM via the player identification device.

In another embodiment, rather than prompting the player to engage the player identification device with the mobile device and the subsequent engagement of the player identification device with the mobile device, the mobile device application automatically determines to transfer a default amount of funds, such as the last transferred amount of funds, from the cashless wagering account to the EGM. In this embodiment, the mobile device application communicates, via a wireless communication protocol, data associated with the determined amount of funds to be transferred from the cashless wagering account to the player identification device. The player identification device proceeds with operating with a cashless wagering system of the non-legacy gaming establishment management system to log the player into a cashless wagering account associated with the player and request the determined amount of funds to be transferred from the cashless wagering account to the EGM via the player identification device.

Following the player identification device requesting the determined amount of funds, the cashless wagering system determines whether to authorize the transfer of the determined amount of funds. If the cashless wagering system determines not to authorize the determined amount of funds, the cashless wagering system communicates a denial to the player identification device and/or the mobile device application, wherein a denial of fund transfer is displayed to the player.

On the other hand, if the cashless wagering system determines to authorize the determined amount of funds, the cashless wagering system updates the cashless wagering account associated with the player and communicates an authorization to the player identification device. The cashless wagering system reduces a balance of the cashless wagering account by the reduced amount of funds. The player identification device communicates this amount of funds available to the EGM. Following receiving data from the player identification device regarding an amount of funds available, the EGM proceeds with updating a credit balance of the EGM to account for the determined amount of funds. In certain embodiments, the player identification device further proceeds with communicating a transfer of funds confirmation to the mobile device, wherein the mobile device application displays a confirmation of the transfer of the amount of funds and/or the updated credit balance of the EGM. Such a transfer amount of funds is available for wagering by the player.

In certain embodiments, the action to be performed additionally or alternatively includes automatically transferring funds from a cashless wagering account to the EGM utilizing the mobile device application and the player identification device. In one such embodiment, the gaming system includes an automatic reload feature wherein if the player identification device determines, via the monitored data, that a credit balance of the EGM falls below a threshold level, the player identification device operates with the mobile device to automatically transfer an amount of funds from the cashless wagering account to the EGM, via the player identification device, to facilitate additional wagering opportunities. It should be appreciated that, in certain embodiments, the gaming system enables the player to enable or disable such an automatic reload feature.

In certain embodiments, the action to be performed additionally or alternatively includes enabling the player to transfer funds from a virtual ticket voucher to the EGM utilizing the mobile device application and the player identification device. In these embodiments, the mobile device application is associated with one or more virtual ticket vouchers. Detailed examples of virtual ticket vouchers and wireless communication protocols are described in: (i) U.S. Published Patent Application No. 2013/0023339, entitled "METHODS AND APPARATUS FOR PROVIDING SECURE LOGON TO A GAMING MACHINE USING A MOBILE DEVICE"; (ii) U.S. Published Patent Application No. 2014/0162768, entitled "METHODS AND APPARATUS FOR PROVIDING SECURE LOGON TO A GAMING MACHINE USING A MOBILE DEVICE"; (iii) U.S. Pat. No. 8,956,222, entitled "MOBILE DEVICE INTERFACES AT AN ELECTRONIC GAMING MACHINE"; (iv) U.S. Published Patent Application No. 2013/0260889, entitled "EMAILING OR TEXTING AS COMMUNICATION BETWEEN MOBILE DEVICE AND EGM"; (v) U.S. Published Patent Application No. 2013/0065668, entitled "REDEMPTION OF VIRTUAL TICKETS USING A PORTABLE ELECTRONIC DEVICE"; (vi) U.S. Pat. No. 2014/0121005, entitled "VIRTUAL TICKET-IN AND TICKET-OUT ON A GAMING MACHINE"; (vii) U.S. Published Patent Application No. 2013/0065678, entitled "RETROFIT DEVICES FOR PROVIDING VIRTUAL TICKET-IN AND TICKET-OUT ON A GAMING MACHINE"; (viii) U.S. Published Patent Application No. 2013/0065686, entitled "BILL ACCEPTORS AND PRINTERS FOR PROVIDING VIRTUAL TICKET-IN AND TICKET-OUT ON A GAMING MACHINE"; (ix) U.S. Pat. No. 8,961,306, entitled "FEEDBACK TO PLAYER OF DEVICE CONNECTION STATE"; (x) U.S. Pat. No. 8,613,668, entitled "DIRECTIONAL WIRELESS COMMUNICATION"; (xi) U.S. Published Patent Application No. 2013/0316808, entitled "METHOD AND APPARATUS FOR ENTERING SENSITIVE DATA FOR AN ELECTRONIC GAMING MACHINE FROM A PORTABLE ELECTRONIC DEVICE"; (xii) U.S. Pat. No. 8,622,836, entitled "USE OF WIRELESS SIGNAL STRENGTH TO DETERMINE CONNECTION"; and (xiii) U.S. Published Patent Application No. 2014/0248941, entitled "TRANSFER VERIFICATION OF MOBILE PAYMENTS"; the entire contents of each of which are incorporated herein by reference.

In certain embodiments, following the launching of the mobile device application, the mobile device application determines an amount of funds to be transferred to the EGM via the redemption of a virtual ticket voucher. In these embodiments, the mobile device application displays to the player images representing any virtual ticket vouchers associated with the mobile device. The mobile device application enables the player to select one or more images representing one or more virtual ticket vouchers associated with the mobile device. In these embodiments, similar to as described above with respect to the transfer of funds from a cashless wagering account to an EGM via a mobile device application and the player identification device, following the determination of which virtual ticket vouchers are to be transferred from the mobile device application to the EGM, the mobile device application prompts the player to cause the mobile device to engage the player identification device. The mobile device application then communicates, via a wireless communication protocol, data associated with the selected virtual ticket voucher to be transferred. The player identification device then communicates with one or more servers of the non-legacy gaming establishment management system, such as a virtual ticket voucher server, to request the selected virtual ticket voucher (and more specifically the amount of funds associated with the selected virtual ticket voucher) be transferred to the EGM via the player identification device. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) following receipt of data from the player identification device regarding the amount of funds associated with the selected virtual ticket voucher, the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following the player identification device determining, via the monitored data, that a full or partial depletion of a credit balance of the EGM has occurred, the player identification device wirelessly communicates with the mobile device and queries the mobile device for the presence of any additional virtual ticket vouchers associated with the mobile device application. That is, when the player identification device determines that the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the player identification device communicates with the mobile device to determine if the mobile device application is associated with any additional available virtual ticket vouchers. If no additional virtual ticket vouchers are available, the player identification device communicates one or more messages to the EGM to cause the EGM to prompt the player to fund the credit balance of the EGM via another funding avenue disclosed herein. On the other hand, if at least one virtual ticket voucher is available, the player identification device operates with the mobile device to facilitate the transfer of such at least one virtual ticket voucher to the EGM. In one such embodiment, the mobile device application communicates a listing of available virtual ticket vouchers to the player identification device. The player identification device proceeds with operating with the EGM to display the listing of available virtual ticket vouchers and enable the player to select one or more of the available virtual ticket vouchers to redeem. If the player selects one or more of the available virtual ticket vouchers, the player identification device communicates the player's selection to the mobile device and the mobile device application proceeds with transferring such virtual ticket vouchers to the EGM, via the player identification device, as described herein. It should be appreciated that this embodiment enables a player to utilize a mobile device to facilitate the transfer funds, such as transfer of funds associated with one or more virtual ticket vouchers associated with the mobile device, without having to reengage the player identification device with the mobile device.

In certain other embodiments, following the player identification device determining, based on the monitored data, that a full or partial depletion of a credit balance of the EGM has occurred, the player identification device wirelessly communicates with the mobile device and queries the mobile device for the presence of any additional virtual ticket vouchers associated with the mobile device application. If no additional virtual ticket vouchers are available, the player identification device operates with the EGM to prompt the player to fund the credit balance of the EGM via another funding avenue disclosed herein. On the other hand, if at least one virtual ticket voucher is available, the mobile device application proceeds with automatically transferring the at least one virtual ticket voucher to the EGM as described herein. It should be appreciated that this embodiment enables a player to automatically transfer funds, such as transfer of funds associated with one or more virtual ticket vouchers associated with the mobile device, via the mobile device without the player having to reengage the player identification device with the mobile device and without the player having to prompt either the player identification device or the mobile device application to initiate such a transfer. It should be further appreciated that, in certain embodiments, the gaming system enables the player to enable or disable such an automatic "transfer of virtual ticket vouchers" feature.

In another embodiment, based on the data monitored by the player identification device, the mobile device application determines when to alert the player to potentially transfer additional funds to the EGM utilizing the mobile device application. For example, the mobile device application could vibrate the mobile device, or create a sound, which alerts the player to view the mobile device application and select which additional funds to virtually insert into or load on the EGM. In another such embodiment, based on this communicated information, the mobile device application determines when to automatically transfer one or more additional and available virtual ticket vouchers to the EGM via the player identification device.

In certain embodiments, the action to be performed additionally or alternatively includes enabling the player to transfer funds from an EGM to a cashless wagering account facilitated by the mobile device application and the player identification device. That is, utilizing at least the player identification device, the present disclosure enables a player to transfer winnings from the EGM back to a cashless wagering account in association with the mobile device application. In certain such embodiments, following the launching of the mobile device application or following the mobile device application retrieving data associated with a cashless wagering account stored via a digital wallet application, and receiving one or more "cash out" inputs from the player, the mobile device application determines an amount of funds to be transferred from the EGM to the cashless wagering account.

In one embodiment, the mobile device application enables the player to select an amount to be transferred from the EGM to the cashless wagering account. In one such embodiment, the mobile device application enables the player to select a portion of the credit balance of the EGM (i.e., less than the entire credit balance) to be transferred from the EGM to the cashless wagering account. In various examples, the mobile device application automatically selects an amount of any winnings (i.e., an amount of the credit balance over the initial credit balance), an amount of winnings over a designated amount, an amount of a last win (i.e., an award amount associated with the last played game) or an amount of a last win over a designated amount (i.e., an award amount associated with the last played game over a designated award amount) to be transferred from the EGM to the cashless wagering account. In another embodiment, the mobile device application determines to transfer the credit balance of the EGM from the EGM to the cashless wagering account.

In certain embodiments, following the determination of an amount of funds to be transferred from the EGM to the cashless wagering account, the mobile device application prompts the player to cause the mobile device to engage the player identification device. As described below, the player identification device of these embodiments then facilitates the transfer of funds from the EGM to the cashless wagering account maintained by the cashless wagering server of the non-legacy gaming establishment management system.

In certain other embodiments, the system determines to facilitate the transfer funds from the EGM to the cashless wagering account independent of any input by the player and/or independent of any engagement between the mobile device and the player identification device. In one such embodiment, if the system determines that no activity has occurred for a designated amount of time, as a precautionary measure, the system transfers, utilizing the player identification device, the credit balance of the EGM from the EGM to the cashless wagering account used to transfer funds to the EGM. In another embodiment, if the system determines that another player is attempting to log onto the EGM, as a precautionary measure, the system transfers, utilizing the player identification device, the credit balance of the EGM from the EGM to the cashless wagering account used to transfer funds to the EGM.

After any engagement between the mobile device and the player identification device (or after the determination of an amount of funds to be transferred if no mobile device to player identification device engagement is required), the mobile device application communicates, via a wireless communication protocol, data associated with the determined amount of funds to be transferred from the EGM to the cashless wagering account. The player identification device proceeds with operating with a cashless wagering system of the non-legacy gaming establishment management system to log the player into a cashless wagering account associated with the player (or confirm that the player remains logged into the cashless wagering account) and request the determined amount of funds to be transferred from the EGM to the cashless wagering account. Following such a request and the player identification device informing the EGM of such a transfer, the EGM proceeds with updating a credit balance of the EGM to account for the determined amount of funds transferred from the EGM to the cashless wagering account. The cashless wagering system additionally updates the cashless wagering account associated with the player (i.e., the cashless wagering system adds the determined amount of funds to the cashless wagering account) and communicates a confirmation to the player identification device. The player identification device further proceeds with communicating a transfer of funds confirmation to the mobile device, wherein the mobile device application displays a confirmation of the transfer of the amount of funds and/or the updated credit balance of the EGM. Such a transferred amount of funds is available in the player's cashless wagering account to be transferred to another EGM.

In certain embodiments, as described above, the cashless wagering account is associated with one or more external accounts, such as one or more credit card accounts, one or more debit card accounts and/or one or more third-party maintained accounts (i.e., one or more PayPal© accounts). In certain such embodiments, the gaming system enables a player to transfer an amount of funds to such an external account. For example, after a player utilizes the mobile device application to "cash out" an amount of winnings from the EGM to the cashless wagering account, the system enables the player to proceed with transferring, facilitated by the mobile device application, part or all of the amount of winnings to one or more external accounts.

In certain embodiments, the action to be performed additionally or alternatively includes automatically transferring funds from the EGM to a cashless wagering account utilizing the mobile device application and the player identification device. In one such embodiment, the gaming system includes an automatic "cash out" feature wherein if the player identification device determines, based on the monitored data, that a credit balance of the EGM reaches above a threshold level, the mobile device automatically transfers an amount of funds from the EGM to the cashless wagering account. It should be appreciated that, in certain embodiments, the gaming system enables the player to enable or disable such an automatic "cash out" feature.

It should be appreciated that the player identification device facilitated EGM to/from mobile device fund data transfers of the present disclosure may occur in addition to or as an alternative from cash-based fund transfers and/or ticket voucher-based fund transfers. That is, in one embodiment, an EGM of the present disclosure is funded via any of a mobile device fund transfer, a cash-based fund transfer or a ticket voucher-based fund transfer. In another embodiment, an EGM of the present disclosure is funded via a mobile device fund transfer or a cash-based fund transfer (but is not funded via any ticket voucher-based fund transfer). In another embodiment, an EGM of the present disclosure is funded via a mobile device fund transfer or a ticket voucher-based fund transfer (but is not funded via any cash-based fund transfer). In another embodiment, an EGM of the present disclosure is funded via a mobile device fund transfer (but is not funded via a cash-based fund transfer nor a ticket voucher-based fund transfer).

Promotional Funds

In certain embodiments, the action to be performed additionally or alternatively includes transferring promotional funds from a player account to the EGM utilizing the mobile device application and the player identification device. In certain such embodiments, rather than utilizing physical promotional tickets which represent promotional and non-cashable credits (i.e., credits that may be used for free game play at an EGM but not otherwise convertible to money), the system utilizes an electronic or virtual ticket to represent promotional and non-cashable funds. In other such embodiments, rather than a player redeeming a physical promotional ticket at a kiosk or player services desk to cause an amount of promotional credits associated with the physical promotional ticket to be associated with a player tracking account, the system utilizes the mobile device application to redeem such promotional and non-cashable credits.

In certain embodiments, to obtain promotional funds, such as one or more electronic or virtual promotional tickets, a gaming establishment communicates data associated with promotional funds, such as an electronic or virtual promotional ticket, to the mobile device application. It should be appreciated that data associated with promotional funds, such as one or more electronic promotional tickets, could be communicated to the mobile devices of a plurality of players (e.g., a gaming establishment communicates to each player with a registered mobile device application a promotional ticket of promotional credits for free play of a new gaming machine the gaming establishment is currently promoting) and/or could be communicated to the mobile device of a particular player (e.g., a gaming establishment communicates to a promotional ticket of promotional credits to a valued player, wherein the promotional credits are redeemable for free play of any gaming machine in the gaming establishment). It should be further appreciated that since the player identification device disclosed herein is utilized to link a first gaming establishment management system to an EGM already associated with or otherwise part of a second gaming establishment management system, the gaming establishment which provides such promotional funds may utilize the first gaming establishment management system or the second gaming establishment management system. That is, a gaming establishment currently employing a gaming establishment management system without promotional funding capabilities may utilize the player identification device to offer promotional funding capabilities of another gaming establishment management system not currently employed by the gaming establishment.

In one such embodiment of communicating data associated with promotional funds, such as an electronic or virtual promotional ticket, to the mobile device application, one or more servers, such as a gaming establishment promotional server, send a message, such as an email or text message, to a player. The message includes a hyperlink and/or an attachment associated with the promotional funds, such as an electronic promotional ticket. When the player accesses the hyperlink and/or attachment via the player's mobile device, the mobile device activates or launches the mobile device application and the associated promotional funds, such as the associated electronic promotional ticket, are transferred to the mobile device application.

In another such embodiment of a gaming establishment communicating data associated with promotional funds, such as an electronic or virtual promotional ticket, to the mobile device application, one or more servers, such as a gaming establishment promotional server, send a message, such as an email or text message, to a player. The message of this embodiment does not include any hyperlink or attachment associated with any promotional funds, such as any electronic promotional tickets and thus no promotional funds are transferred to the mobile device application via this message. Rather, the message of this embodiment notifies the player that an account associated with the player has been credited with promotional funds. Such a message could include information associated with the available promotional funds (e.g., an amount of promotional credits, a promotional fund identifier, and/or a time window which the promotional funds may be redeemed). In this embodiment, when the mobile device application is activated or launched by a player, the mobile device application queries one or more servers, such as a gaming establishment promotional server, for any promotional funds available to the player. In this embodiment, the one or more servers transfer data associated with any promotional funds available to the player to the mobile device application.

In another such embodiment of communicating data associated with promotional funds, such as an electronic or virtual promotional ticket, to the mobile device application, one or more servers, such as a gaming establishment promotional server, send a message to the mobile device application to associate the mobile device application with promotional funds, such as one or more electronic or virtual promotional tickets. Such a message could be sent via email, text, tcp/ip or other suitable networking technology that communicates the promotional funds, such as the electronic or virtual promotional ticket and/or information associated with the electronic promotional ticket (e.g., an amount of promotional credits, a promotional ticket identifier, and/or a time window which the electronic promotional ticket may be redeemed) to the mobile device application.

In another such embodiment of communicating data associated with promotional funds, such as an electronic or virtual promotional ticket, to the mobile device application, when the mobile device application is activated or launched by a player, the mobile device application queries one or more servers, such as a gaming establishment promotional server, for any promotional funds, such as any electronic or virtual promotional tickets, available to the player. That is, in certain embodiments, following the launching of the mobile device application, the system determines if any promotional funds are to be transferred to the EGM facilitated by the mobile device application. In this embodiment, if the server determines that promotional funds are available for the player, such as one or more electronic or virtual promotional tickets are available for the player and/or an amount of promotional funds are associated with the player's account, the server transfers data associated with any promotional funds available to the player to the mobile device application.

In another such embodiment of communicating data associated with promotional funds, such as an electronic or virtual promotional ticket, to the mobile device application, when the mobile device and/or mobile device application detects that the mobile device is located in a gaming establishment associated with the mobile device application, the mobile device application queries one or more servers, such as a gaming establishment promotional server, for any promotional funds, such as any electronic or virtual promotional tickets, available to the player and/or an amount of promotional funds associated with the player's account. In this embodiment, if the server determines that promotional funds are available for the player, such as one or more electronic or virtual promotional tickets are available and/or an amount of promotional funds are associated with the player's account, the server transfers data associated with any promotional funds available to the player to the mobile device application.

It should be appreciated that in certain of these embodiments of communicating data associated with promotional funds, such as an electronic or virtual promotional ticket, to the mobile device application, the promotional funds, such as the electronic or virtual promotional tickets, are stored by the mobile device in association with the mobile device application. For example, data communicated to the mobile device application includes the electronic promotional ticket which is redeemable at the EGM via the mobile device application. In other embodiments of communicating data associated with promotional funds, such as an electronic or virtual promotional ticket, to the mobile device application, the promotional funds, such as the electronic or virtual promotional tickets, are stored by one or more servers, such as a gaming establishment promotional server, but viewable via the mobile device application. For example, the electronic promotional ticket reside on the server, such as a gaming establishment promotional server, and the data communicated to the mobile device application includes identifying information associated the electronic promotional ticket (e.g., an amount of promotional credits, a promotional ticket identifier, and/or a time window which the electronic promotional ticket may be redeemed). Accordingly, in each of these embodiments, the mobile device stores, in association with the mobile device application, data associated with promotional funds, such as one or more electronic promotional tickets, to replace the use of and certain downsides or disadvantages associated with paper promotional tickets.

Following the mobile device application obtaining data associated with promotional funds, such as an electronic or virtual promotional ticket, to the mobile device application, the promotional funds, such as the electronic or virtual promotional tickets, are accessible by the mobile device in association with the mobile device application. That is, as described above in relation to how funds are facilitated to be transferred from a mobile device to an EGM via the mobile device application, promotional funds, such as one or more electronic promotional tickets (or promotional credits associated with such electronic promotional tickets), are viewable via the mobile device application and transferable from the mobile device to the EGM via the mobile device application.

Securing Transactions Between Mobile Device and Player Identification Device

While the facilitation of the transfer of funds to and from an EGM via a mobile device has many advantages described herein, certain security concerns arise when transferring fund data wirelessly between an EGM and a mobile device via one or more servers and the player identification device. For example, a malicious person may attempt to intercept such a wireless communication and steal the funds being transferred. Such a malicious person may devise electronics, such as an antenna or other electronics placed on or near the EGM to insert their mobile device between a "cash out" input and the mobile device engaging the player identification device.

More specifically, when facilitating the transfer of deposited funds and/or an amount of winnings from the EGM to a cashless wagering account via the mobile device application, as described herein a player initiates an engagement of the player identification device with the mobile device. However, before the engagement of the player identification device with the player's mobile device is complete, an intruder utilizes such devised electronics to beat the player to the completion of the engagement. In this example, when the player identification device determines, based on the monitored data, that the player subsequently actuates a "cash out" button on the EGM, the player identification device proceeds with transferring the amount of the credit balance of the mobile device of the intruder. Such a concern is also present when a player attempts to wirelessly transfer funds to an EGM via a mobile device wherein the intruder device intercepts such a transfer and reroutes the funds to the mobile device of the intruder.

In view of these security concerns, certain embodiments of the present disclosure utilize a time window, such as ten seconds, in association with one or more requested actions.

In one such embodiment, after receiving an initiation of an engagement of the player identification device with the mobile device, the player identification device assigns or otherwise associates a time window with such an engagement. If one mobile device is attempted to be paired with the player identification device within the associated time window before an action is requested, the player identification device determines that only one mobile device is communicating with the player identification device and the player identification device proceeds with executing the requested action, such as a requested fund transfer as described herein. On the other hand, if more than one mobile device is attempted to be paired with the player identification device within the associated time window before an action is requested, the player identification device determines that an intruder device may be present. In such a situation, the player identification device cancels the requested action and/or prompts the player to reengage the player identification device with the mobile device.

In another such embodiment, after receiving a requested action from the mobile device, the player identification device assigns or otherwise associates a time window with such a requested action. Following the requested action, if one mobile device is attempted to be paired with the player identification device within the associated time window, the player identification device determines that only one mobile device is communicating with the player identification device and the player identification device proceeds with executing the requested action, such as a requested fund transfer as described herein. On the other hand, following the requested action, if more than one mobile device is attempted to be paired with the player identification device within the associated time window, the player identification device determines that an intruder device may be present. In such a situation, the player identification device cancels the requested action and/or prompts the player to reengage the player identification device with the mobile device.

It should be appreciated that in addition to thwarting an isolated attempt by an intruder to intercept a wireless fund transfer, the system is configured to identify if a device is involved in multiple attempted engagements with an player identification device over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

Mobile Device/Player Identification Device Communications

As indicated above, in various embodiments, the facilitation of the transfer of funds between a cashless wagering account maintained for a player and an EGM is accomplished by one or more wireless communication protocols between the player identification device and the mobile device.

In certain embodiments, the communication with the mobile device can occur through one or more wireless interfaces of the player identification device. Such wireless interfaces are configured to receive information, such as information associated with one or more accounts and instructions to initiate a transfer of funds to and from a cashless wagering account and the EGM utilizing a mobile device.

In certain embodiments, as described above, the wireless interface is integrated into a player identification device mounted to and/or within the gaming machine cabinet.

In certain embodiments disclosed herein, the wireless interface implements a near field communication (NFC) protocol to facilitate the transfer of funds between a cashless wagering account maintained for a player and an EGM.

NFC is typically used for communication distances of 4 cm or less. NFC, enables for simplified transactions, data exchange, and connections with a touch. Formed in 2004, the Near Field Communication Forum (NFC Forum) promotes sharing, pairing, and transactions between NFC devices and develops and certifies device compliance with NFC standards. NFC's short range helps keep encrypted identity documents private. Thus, as described above, a tap of a mobile device with an NFC chip to an EGM can cause a transfer of funds to an EGM and/or serve as keycard or ID card for a loyalty program.

In certain embodiments which utilize the NFC implementation, the mobile device application registers a mobile device application with one or more processors of the mobile device. In these embodiments, when the mobile device is detected by an NFC reader of the player identification device, the player identification device communicates one or more data messages, such as a Select Application Protocol Data Unit (APDU) to the mobile device (or to one or more servers which then communicate such data messages to the mobile device). Such data messages are commands generated by the component of the non-legacy gaming establishment management system, such as the player identification device, when the mobile device is detected in the NFC reader field. The processor of the mobile device communicates the data message to the mobile device application. The mobile device application responds, such as communicating a triggering message, and a communication channel is opened between the player identification device and the mobile device application. This open communication channel enables the player identification device to send, though the NFC reader, additional data messages to the mobile device (or to the mobile device via one or more servers) which are responded to by the mobile device application of the mobile device.

It should be appreciated that as long as the mobile device remains within the NFC field, the player identification device is configured to communicate with the mobile device and send data, such as status updates, as necessary. However, once the mobile device is removed from the NFC field, the communication channel is closed and such status updates must be discontinued.

In various embodiments, in addition to the Select Application APDU, the player identification device is configured to communicate other commands to the mobile device. Such commands include the following data messages:

(i) a Card Inserted APDU which confirms that the player is logged into the player tracking system (e.g., an electronic player tracking card is associated with the EGM);

(ii) a Card Removed APDU which confirms that the player is logged out of the player tracking system (e.g., an electronic player tracking card is removed or no longer associated with the EGM);

(iii) a New Card Scanned APDU which reports that a physical card is detected in the player tracking card reader;

(iv) a PIN Status APDU which reports a personal identification number verification status;

(v) a Transfer Status APDU which reports a transfer request status;

(vi) a Balance Status APDU which reports a balance request status; and (vii) a Disconnect APDU which informs the mobile device application to drop the connection with the EGM, such as when the EGM cashout button is pressed, when the gaming system determines that the player card is "abandoned" or when the EGM credit balance reaches zero and remains at zero for a designated period of time, such as thirty seconds.

In other embodiments, the wireless interface implements a Wi-Fi, cellular and/or Bluetooth™ communications protocol to facilitate the transfer of funds between a cashless wagering account maintained for a player and an EGM.

In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the player identification device, zero, one or more servers and a mobile device, such as secure pairing using one of these protocols. That is, in one embodiment, an NFC interface on the player identification device can be used to set-up a higher speed communication between the player identification device, zero, one or more servers and the NFC enabled mobile device. The higher speed communication rates can be used for expanded content sharing. For instance, a NFC and Bluetooth enabled player identification device can be tapped by an NFC and Bluetooth enabled mobile device for instant Bluetooth pairing between the devices and zero, one or more servers. Instant Bluetooth pairing between the player identification device, an NFC enabled mobile device and zero, one or more servers, can save searching, waiting, and entering codes. In another example, the player identification device can be configured as an NFC enabled router, such as a router supporting a Wi-Fi communication standard. Tapping an NFC enabled mobile device to an NFC enabled and Wi-Fi enabled player identification device can be used to establish a Wi-Fi connection between the devices and zero, one or more servers.

In certain embodiments which implement a Wi-Fi, cellular and/or Bluetooth™ communications protocol, the system disclosed herein utilizes one or more QR codes generated by the player identification device (and possibly displayed by a display device of the EGM) to facilitate the communication of data between the mobile device and the player identification device. In such embodiments, the QR code is used to identify the player identification device to the server to which the mobile device should connect. It should be appreciated that the QR code enables the player identification device to establish a secure tunnel or path from the mobile device to the gaming establishment's Wi-Fi network and then to the gaming establishment's wired network and finally to the player identification device. In these embodiments, a communication tunnel wrapper (i.e., a Wi-Fi/Bluetooth™ tunnel wrapper) is utilized to establish a connection between the gaming system and the mobile device and to transport any data messages described herein between the player identification device, zero, one or more servers and the mobile device.

More specifically, in certain embodiments, the player requests, via an input, the generation of a QR code. In response to the player's request, the player identification device causes a display of a QR code. In certain embodiments, the QR code includes a nonce which prevents a third-party (e.g., another player) from sniping the player's login attempt. Such an on-demand QR code remains valid for a designated amount of time such that if the player does not scan the QR code within the designated amount of time, another QR code is necessary to be scanned to connect the mobile device to the player identification device.

Figure 3E:
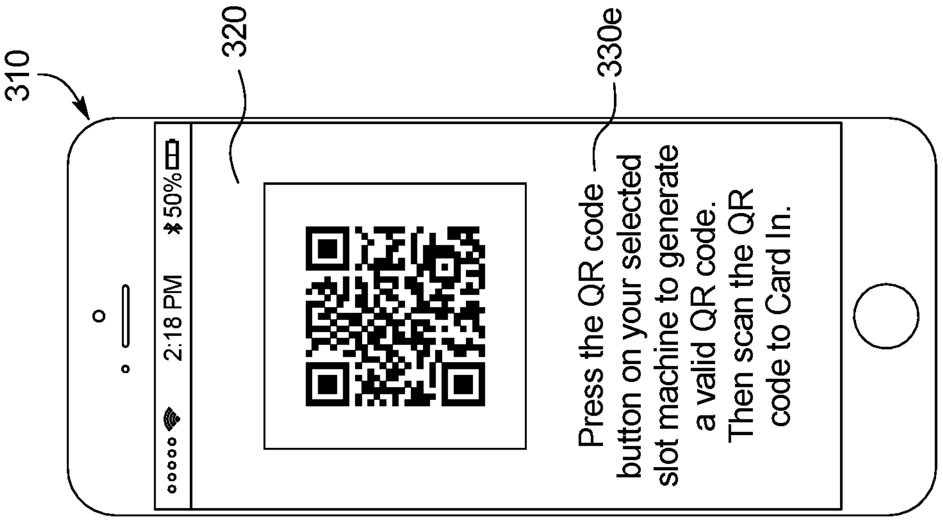
Figure 3D:
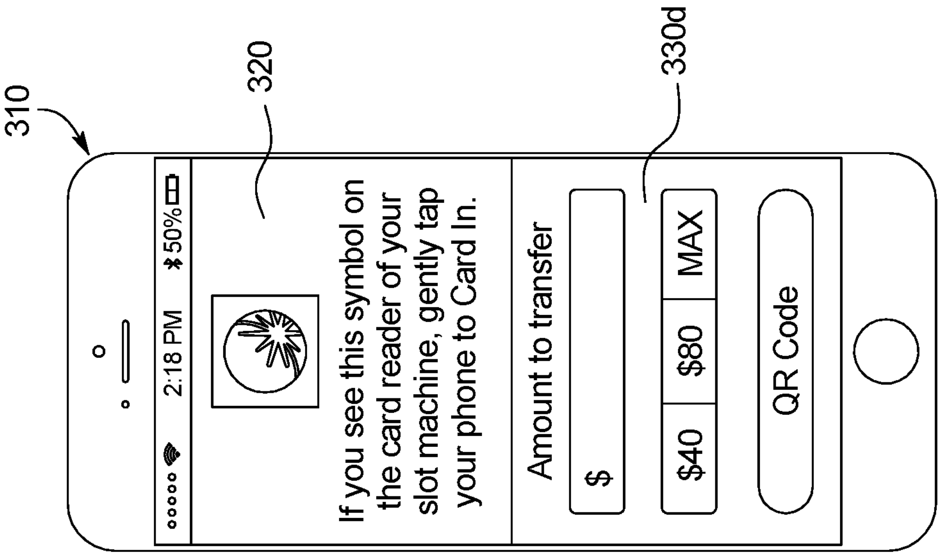

In these embodiments, as seen in FIG. 3E, the player scans the QR code with the mobile device application. If the system determines that the QR code is valid (i.e., not expired), the mobile device application will connect to the player identification device. It should be appreciated that as long as the established connection between the mobile device and the player identification device remains active, one or more gaming system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the player identification device, such as a new scanning of the QR code to send such a requested action from the mobile device to the player identification device (or to send a requested action from the mobile device to one or more servers and then from one or more servers to the player identification device).

In certain embodiments, following the scanning of a valid QR code, the mobile device application connects to one or more servers of the non-legacy gaming establishment management system. It should be appreciated that in certain embodiments, one or more of the servers are scalable servers configured to scale to accept connections from thousands of mobile devices.

In certain embodiments, after establishing a connection with one or more servers, the mobile device application transmits a connect command to the player identification device. In response to receiving a connect command from the mobile device, the player identification device sends an APDU Select Application Request to the mobile device. This APDU serves to encapsulate APDU commands between the player identification device and the mobile device. In these embodiments, if the mobile device application does not receive this APDU within a designated period of time, such as within five seconds, the mobile device application displays an error message to the player and directs the player to rescan the QR code.

In addition to the connect command communicated from the mobile device application to the player identification device, the mobile device application of these embodiments is configured to send a disconnect command to the system. Such a disconnect command functions to tear-down the connection to the server. That is, after the server receives the disconnect command from the mobile device application, the server sends this disconnect command to the translator and close the websocket to the mobile device application. In these embodiments, if the websocket is not closed or otherwise terminated within a designated period of time, such as five seconds, the mobile device application may retry communicating this command or close the websocket. It should be appreciated that if the mobile device connection is severed before this command is received, the sever sends this command on behalf of the mobile device application.

In another embodiment, the mobile device application is configured to send a trigger command to the player identification device. In this embodiment, the trigger command is associated with an action requested by the player, such as a transfer of funds to or from the EGM. In such embodiments, when the player identification device receives the trigger command from the mobile device application, the player identification device will communicate the appropriate APDU request to the mobile device application. If the mobile device application does not receive this APDU within a designated amount of time, such as five seconds, the mobile device application will display an error message to the player and enable the player to retry the requested action.

In other embodiments, the mobile device application communicates with one or more components of the non-legacy gaming establishment management system through a tunnel established over the mobile device's Wi-FI network or the mobile device's network connection. In such embodiments, the mobile device application will connect to one or more servers which use websockets secured with a transport layer security protocol. The server operates with one or more translators, similarly using websockets secured with a transport layer security protocol to communicate data to the player identification device.

In certain embodiments which utilize the NFC communication protocol described herein, which utilize the Wi-Fi, BLE, cellular and/or Bluetooth™ communication protocols described herein and/or which utilize any other communication protocol described herein, any action requested by the player via the mobile device application requires a new engagement between the mobile device and the player identification device. In certain other embodiments which utilize the NFC communication protocol described herein, which utilize the Wi-Fi, BLE, cellular and/or Bluetooth™ communication protocols described herein and/or which utilize any other communication protocol described herein, certain actions requested by the player via the mobile device application requires a new engagement between the mobile device and the player identification device and other actions requested by the player via the mobile device application do not require any new engagement between the mobile device and the player identification device.

Funding Accounts

As indicated above, in various embodiments, the electronic transfer of funds to an EGM is facilitated by a mobile device application and the player identification device and drawn from one or more accounts, such as a cashless wagering account. In certain of these embodiments, as described above, a cashless wagering account is associated with a third-party account, such as a bank account or a credit card account, from which funds are drawn from to fund the cashless wagering account.

In certain embodiments, the system enables funds to be deposited in a cashless wagering account via a kiosk that accepts money. In certain embodiments, as described above, the kiosk also enables a player to establish a cashless wagering account to be associated with the below-described receipt of money. In certain embodiments, the system enables a player that has an amount of cash to utilize a kiosk to convert the cash to an amount deposited into a cashless wagering account (which is subsequently transferred to an EGM utilizing a mobile device application and the player identification device). In other embodiments, the system enables a player that has an amount of cash to utilize a kiosk to convert the cash to a balance of a mobile device application (which is subsequently transferred to an EGM utilizing the mobile device application and the player identification device). In other embodiments, the system enables funds to be deposited in a cashless wagering account via a kiosk that accepts printed ticket vouchers. In certain embodiments, the system enables a player that has one or more printed ticket vouchers to utilize a kiosk to convert the printed ticket voucher to an amount deposited into a cashless wagering account (which is subsequently transferred to an EGM utilizing a mobile device application and the player identification device). In other embodiments, the system enables a player that has one or more printed ticker vouchers to utilize a kiosk to convert the printed ticket vouchers to a balance of a mobile device application (which is subsequently transferred to an EGM utilizing the mobile device application and the player identification device).

In certain embodiments, the system enables funds to be deposited in a cashless wagering account via the EGM and the player identification device similar to the above-described process of transferring an amount of funds from the EGM to the cashless wagering account utilizing the player identification device. In certain embodiments, the system enables a player that has an amount of cash to utilize an EGM and the player identification device to convert the cash to an amount deposited into a cashless wagering account (which is subsequently transferred back to the EGM utilizing a mobile device application and the player identification device). In other embodiments, the system enables a player that has an amount of cash to utilize an EGM and the player identification device to convert the cash to a balance of a mobile device application (which is subsequently transferred back to the EGM utilizing the mobile device application and the player identification device). In other embodiments, the system enables the funds to be deposited in a cashless wagering account via an EGM and the player identification device that accepts printed ticket vouchers. In certain embodiments, the system enables a player that has one or more printed ticket vouchers to utilize an EGM and the player identification device to convert the printed ticket voucher to an amount deposited into a cashless wagering account (which is subsequently transferred back to the EGM utilizing a mobile device application and the player identification device). In other embodiments, the system enables a player that has one or more printed ticker vouchers to utilize an EGM and the player identification device to convert the printed ticket vouchers to a balance of a mobile device application (which is subsequently transferred back to the EGM utilizing the mobile device application and the player identification device).

In certain embodiments, the system enables funds to be deposited in a cashless wagering account via a gaming establishment interface, such as a casino desk. In certain embodiments, the system enables a player that has an amount of cash to utilize a gaming establishment interface, such as a casino desk to convert the cash to an amount deposited into a cashless wagering account (which is subsequently transferred to an EGM utilizing a mobile device application and the player identification device). In other embodiments, the system enables a player that has an amount of cash to utilize a gaming establishment interface, such as a casino desk, to convert the cash to a balance of a mobile device application (which is subsequently transferred to an EGM utilizing the mobile device application and the player identification device). In other embodiments, the system enables funds to be deposited in a cashless wagering account via a gaming establishment interface that accepts printed ticket vouchers. In certain embodiments, the system enables a player that has one or more printed ticket vouchers to utilize a gaming establishment interface to convert the printed ticket voucher to an amount deposited into a cashless wagering account (which is subsequently transferred to an EGM utilizing a mobile device application and the player identification device). In other embodiments, the system enables a player that has one or more printed ticker vouchers to utilize a gaming establishment interface to convert the printed ticket vouchers to a balance of a mobile device application (which is subsequently transferred to an EGM utilizing the mobile device application and the player identification device).

In one or more of these embodiments which utilize a kiosk, an EGM and/or a gaming establishment interface enable a player to anonymously deposit an amount of money for wagering. In one or more of these embodiments which utilize a kiosk, an EGM and/or a gaming establishment interface enable a player to log into one or more player accounts utilizing the player identification device and then deposit an amount of money for wagering in such an anonymous account. It should be appreciated that in these embodiments, since the identification of the player remains anonymous, the functionality of the player identification device disclosed herein is implemented with a player interaction device which identifies an account associated with an anonymous player, but which may or may not identify the player.

More specifically and utilizing the example of a kiosk, in one embodiment, the player wirelessly pairs or otherwise connects a mobile device. In one example embodiment, the player moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with the player identification device as described above.

After connecting the mobile device to the kiosk, the kiosk prompts the player to deposit an amount of funds into the kiosk. In one such embodiment, the kiosk prompts the player to insert one or more bills into a bill acceptor of the kiosk. In another such embodiment, the kiosk additionally or alternatively prompts the player to deposit a physical ticket voucher (associated with an amount of funds) into the kiosk. In another such embodiment, the kiosk additionally or alternatively prompts the player to deposit a card associated with an external account, such as a credit card or debit card into the kiosk. In another such embodiment, the kiosk additionally or alternatively prompts the player to enter information associated with an external account, such as a credit card account, a PayPal® account or debit card account into the kiosk. In another such embodiment, the kiosk additionally or alternatively prompts the player to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the player to transfer the deposited amount of funds (e.g., a "Load Phone Now" button) or continue to deposit additional amounts of funds with the kiosk. In another embodiment, for each amount of funds accepted by the kiosk, such as for each bill or unit of currency accepted by the kiosk, a virtual ticket voucher is created, as described below, and transferred first to the kiosk and then to the mobile device application in communication with the kiosk.

In certain embodiments, upon receiving an amount of funds from the player and the player indicating to transfer the deposited amount of funds in association with the mobile device application, the kiosk communicates with one or more servers, such as a cashless wagering server of the non-legacy gaming establishment management system, to transfer an amount of money to a cashless wagering account (to be drawn upon from the mobile device application as described herein).

In another such embodiment, upon receiving an amount of funds from the player and the player indicating to transfer the deposited amount of funds in association with the mobile device application, the kiosk transfers an amount of money wirelessly to the mobile device to establish a mobile device application balance (to be transferred to an EGM via the player identification device for subsequent wagering).

In another such embodiment, upon receiving an amount of funds from the player and the player indicating to transfer the deposited amount of funds in association with the mobile device application, the kiosk communicates with one or more servers, such as a virtual ticket voucher server of the non-legacy gaming establishment management system, to create a virtual ticket voucher associated with the amount of received currency. The system disclosed herein transfers the created virtual ticket voucher to the mobile device application (to be subsequently transferred to the EGM via the player identification device for wagering).

In one such embodiment including the deposit of an amount of funds at a kiosk resulting in the creation of a virtual ticket voucher wirelessly transferred to a mobile device, the virtual ticket voucher is encrypted with a private key only known, for security reasons, to the mobile device application. In this embodiment, one or more servers, such as a virtual ticket voucher server, encrypt the virtual ticket voucher using a public key for the mobile device application (or player account), which ensures that the only entity that can decrypt the virtual ticket voucher is the mobile device application running on the mobile device. That is, the mobile device application has a private key and a public key, wherein the mobile device application shares the public key with one or more servers, such as a virtual ticket voucher server. When the server needs to create a new virtual ticket voucher, the server encrypts the virtual ticket voucher with the public key for the mobile device application such that only the mobile device application can use the virtual ticket voucher since the mobile device application has the private key (thus providing additional security by preventing others from copying the virtual ticket voucher information and attempting to use the created virtual ticket voucher).

In another such embodiment including the deposit of an amount of funds at a kiosk resulting in the creation of a virtual ticket voucher wirelessly transferred to a mobile device, the virtual ticket voucher is additionally or alternatively digitally signed by the server to enable the mobile device application to verify that any received virtual ticket voucher was issued by the correct server. In this embodiment, the created virtual ticket voucher is transferred from the server to the kiosk over a secure communications channel and then further transferred by the kiosk to the mobile device application over a secure wireless communications channel. Such an embodiment relies upon secure transport communications between the kiosk and the server, secure communications between the kiosk and the mobile device application and the server's digital signature that cannot be changed by any intermediaries between the server and the mobile device application.

In another such embodiment including the deposit of an amount of funds at a kiosk resulting in the creation of a virtual ticket voucher wirelessly transferred to a mobile device, the virtual ticket voucher is alternatively transferred from the server to the kiosk over a secure communications channel and then further transferred by the kiosk to the mobile device application over a secure wireless communications channel without encryption or digital signatures. Such an embodiment relies upon secure transport communications between the kiosk and the server, and secure communications between the kiosk and the mobile device application wherein the server trusts that the kiosk is secure and cannot manipulate or reveal information to potential attackers about the virtual ticket vouchers that pass through the kiosk to the mobile device application.

It should be appreciated that while the above example embodiments are described in relation to transferring one or more amounts of money or units of currency from a kiosk to a mobile device application, such example embodiments may also be used to transfer one or more amounts of money or units of currency from an EGM to a mobile device application utilizing the player identification device (either as an isolated transaction or as part of an operation mode of the EGM) and/or from a gaming establishment interface, such as a casino desk, to a mobile device application.

It should be further appreciated that while the above-described embodiments pertain to converting one or more amounts of money or units of currency from a kiosk to a mobile device application, in other embodiments, the system disclosed herein is configured to convert one or more virtual ticket vouchers associated with a mobile device application to one or more units of currency at a kiosk, EGM or gaming establishment interface, such as a casino desk.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 4:
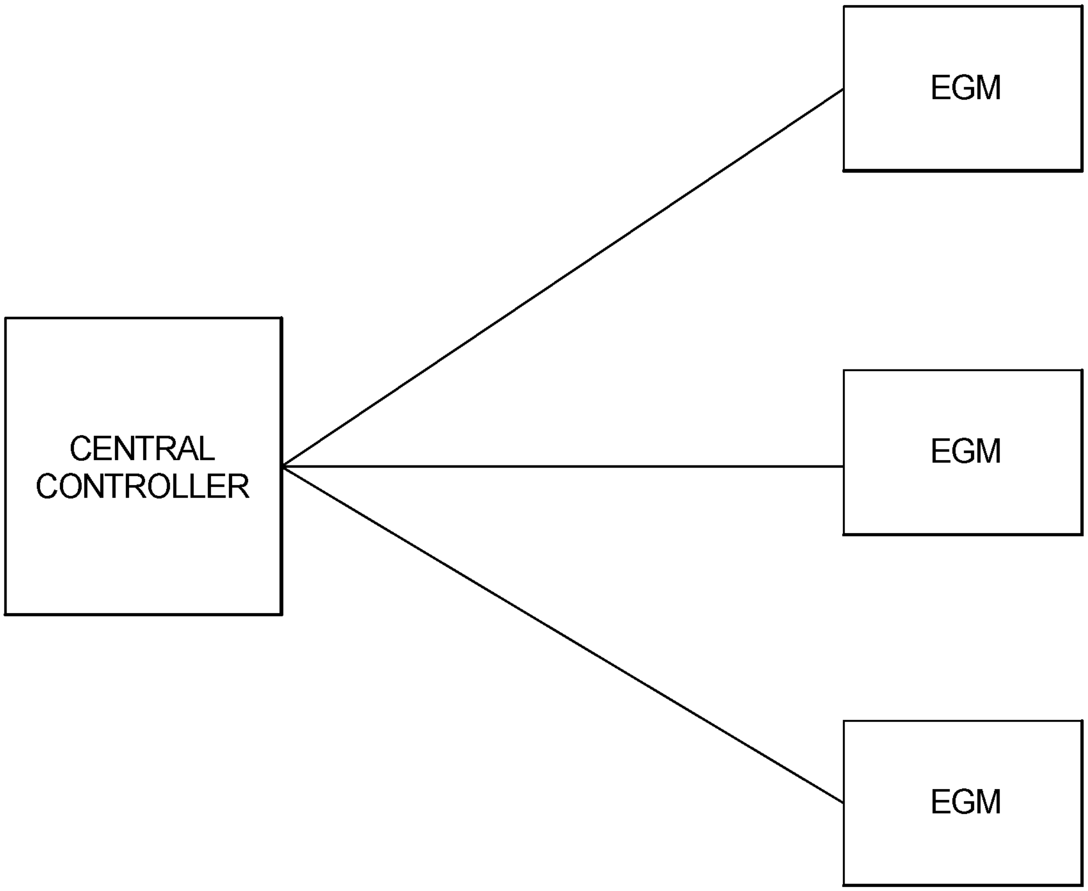
FIG. 4 is a schematic block diagram of one embodiment of a network configuration of the gaming system disclosed herein.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 4 includes a plurality of EGMs that are each configured to communicate with a central server, central controller, or remote host through a data network.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader or communicated from a mobile device; by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5:
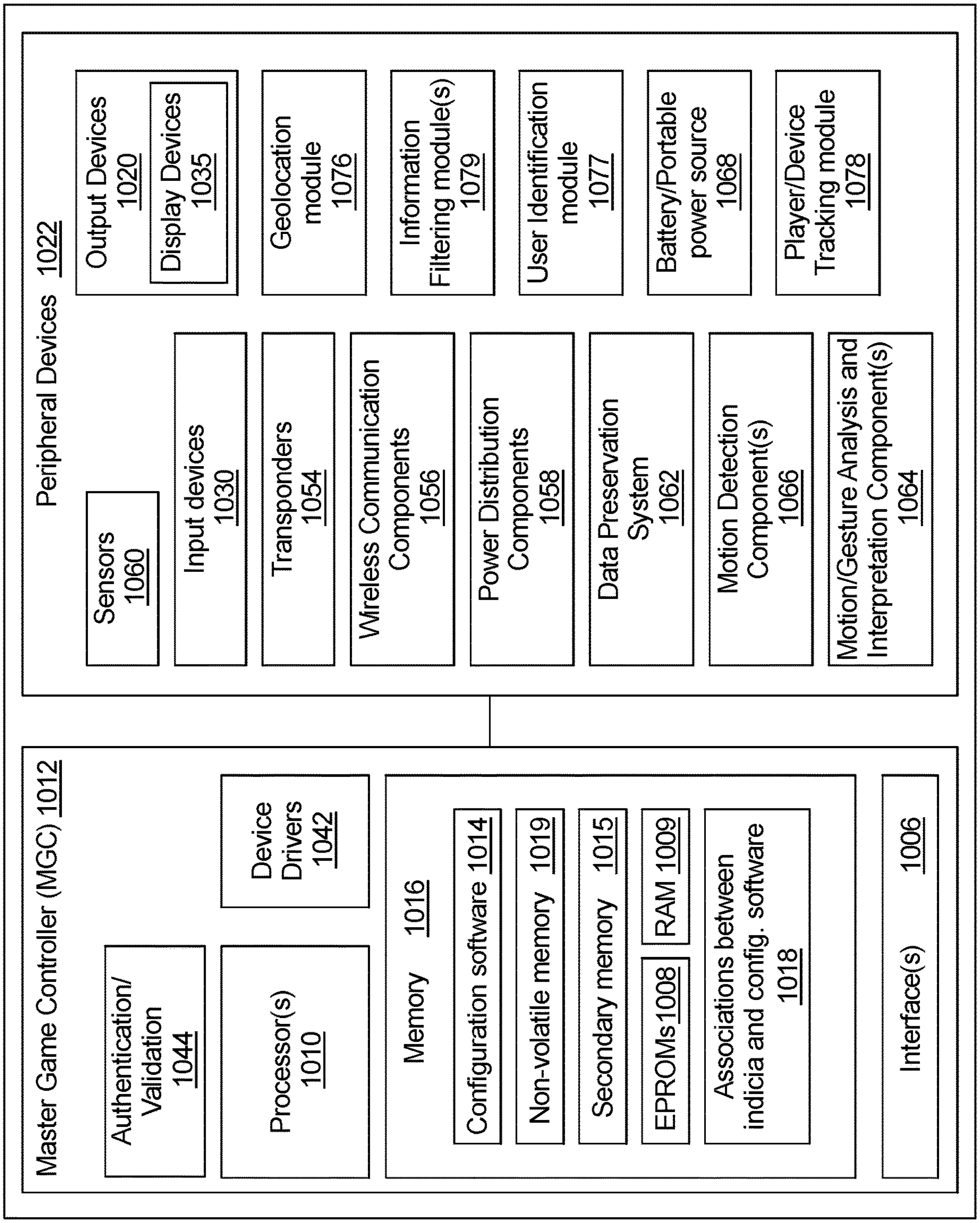
FIG. 5 is a schematic block diagram of one embodiment of an electronic configuration of an example gaming system disclosed herein.
Figure 6A:
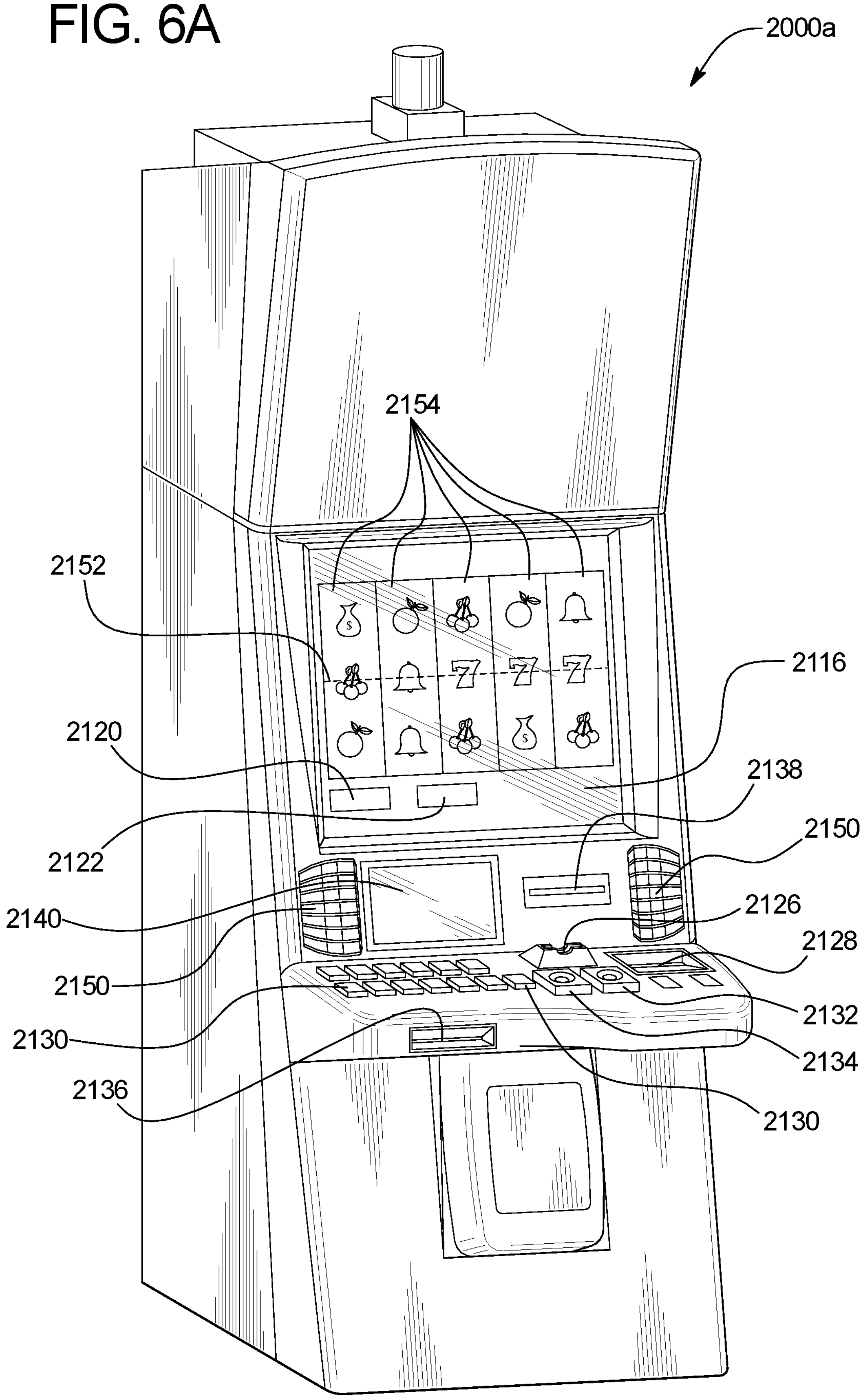
FIGS. 6A and 6B are perspective views of example alternative embodiments of the gaming system disclosed herein.
Figure 6B:
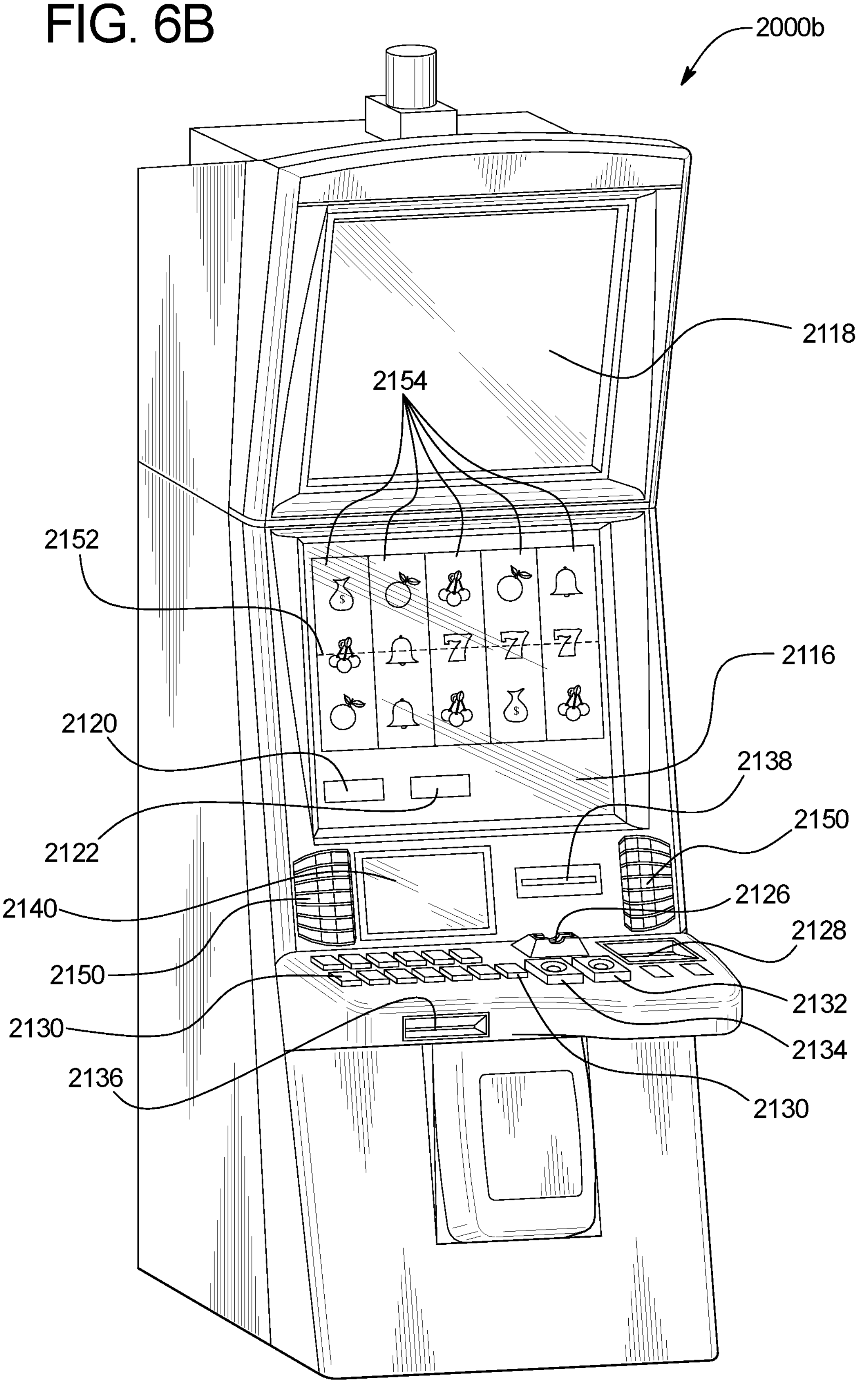

FIG. 5 is a block diagram of an example EGM 1000 and FIGS. 6A and 6B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as, but not limited to, TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display (either as part of a legacy player tracking unit or as part of the player identification device disclosed herein) configured to display various information regarding a player's player tracking status (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 6A includes a central display device 2116, a player tracking display 2140, a credit display 2120, and a bet display 2122. The example EGM 2000***b* illustrated in FIG. 6B includes a central display device 2116, an upper display device 2118, a player tracking display 2140, a credit display 2120, and a bet display 2122. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, non-cashable credits, free game play credits, and/or player tracking points or credits.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 6A and 6B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 6A and 6B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrates in FIGS. 6A and 6B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 6A and 6B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 6A and 6B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 6A and 6B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 6A and 6B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 6A and 6B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players, and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 6B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems as described above. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into the above-described card reader of the player identification device to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader of the above-described player identification device, the gaming system utilizes one or more portable devices, such as a mobile device, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player identification device (such as any feature enabled via the communication between the player identification device and one or more components of one or more non-legacy gaming establishment management systems) is displayed via one or more service windows that are displayed on the central display device and/or the upper display device. Examples of player tracking systems to which the above-described player identification device is added to are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611, 411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, in certain embodiments which utilize cash-based wagering and ticket-voucher based wagering in addition to any funding of an EGM via a mobile device, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system as described in detail above.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device comprising:

a processor; and a memory device that stores a plurality of instructions that, when executed by the processor, cause the processor to:

monitor activity data communicated to a slot machine interface board associated with a resident gaming establishment management system, communicate the monitored activity data to a non-resident gaming establishment management system that is distinct from and operates independent of the resident gaming establishment management system, and responsive to receiving data of an event associated with the non-resident gaming establishment management system, cause the event to be associated with an electronic gaming machine, wherein the electronic gaming machine is distinct from the resident gaming establishment management system and the non-resident gaming establishment management system, the resident gaming establishment management system does not offer the event in association with the electronic gaming machine and the event associated with the non-resident gaming establishment management system is determined based on the monitored activity data.

2. The device of claim 1, wherein the event associated with the non-resident gaming establishment management system differs from any event associated with the resident gaming establishment management system.

3. The device of claim 1, wherein the event associated with the non-resident gaming establishment management system comprises a feature to be offered by the non-resident gaming establishment management system.

4. The device of claim 1, wherein the non-resident gaming establishment management system comprises a cashless wagering server and the event comprises a modification of a credit balance of the electronic gaming machine to occur responsive to a cashless wagering account being accessed in association with a mobile device and an amount of funds from the cashless wagering account being approved by the cashless wagering server.

5. The device of claim 1, wherein the non-resident gaming establishment management system comprises a progressive award server and the event comprises a progressive award to be won.

6. The device of claim 1, wherein the non-resident gaming establishment management system comprises a mystery bonus award server and the event comprises a mystery bonus award to be won independent of any displayed event occurring during a play of a game of the electronic gaming machine.

7. The device of claim 1, wherein the non-resident gaming establishment management system comprises a content management server and the event comprises an occurrence of a display, by a display device of the electronic gaming machine, of an externally controlled interface.

8. A method of operating a non-resident gaming establishment management system, the method comprising:

receiving monitored activity data communicated to a slot machine interface board associated with a resident gaming establishment management system, the resident gaming establishment management system being distinct from and operating independent of the non-resident gaming establishment management system, determining, by a processor, an event based on the received monitored activity data, wherein the resident gaming establishment management system does not offer the event in association with an electronic gaming machine, and communicating data associated with the determined event to the electronic gaming machine, wherein the electronic gaming machine is distinct from the resident gaming establishment management system and the non-resident gaming establishment management system.

9. The method of claim 8, wherein the determined event comprises an activation of a feature of the electronic gaming machine.

10. The method of claim 8, wherein the determined event comprises a modification of a credit balance of the electronic gaming machine responsive to a cashless wagering account being accessed in association with a mobile device.

11. The method of claim 8, wherein the determined event comprises a progressive award being won.

12. The method of claim 8, wherein the determined event comprises a mystery bonus award being won independent of any displayed event occurring during a play of a game of the electronic gaming machine.

13. The method of claim 8, wherein the determined event comprises an occurrence of a display, by a display device of the electronic gaming machine, of an externally controlled interface.

14. A method of operating a device, the method comprising:

monitoring, by a processor, activity data communicated to a slot machine interface board associated with a resident gaming establishment management system, communicating the monitored activity data to a non-resident gaming establishment management system that is distinct from and operates independent of the resident gaming establishment management system, and responsive to receiving data of an event associated with the non-resident gaming establishment management system, causing, by the processor, the event to be associated with an electronic gaming machine, wherein the electronic gaming machine is distinct from the resident gaming establishment management system and the non-resident gaming establishment management system, the resident gaming establishment management system does not offer the event in association with the electronic gaming machine and the event associated with the non-resident gaming establishment management system is determined based on the monitored activity data.

15. The method of claim 14, wherein the event associated with the non-resident gaming establishment management system differs from any event associated with the resident gaming establishment management system.

16. The method of claim 14, wherein the event associated with the non-resident gaming establishment management system comprises a feature to be offered by the non-resident gaming establishment management system.

17. The method of claim 14, wherein the non-resident gaming establishment management system comprises a cashless wagering server and the event comprises a modification of a credit balance of the electronic gaming machine to occur responsive to a cashless wagering account being accessed in association with a mobile device and an amount of funds from the cashless wagering account being approved by the cashless wagering server.

18. The method of claim 14, wherein the non-resident gaming establishment management system comprises a progressive award server and the event comprises a progressive award to be won.

19. The method of claim 14, wherein the non-resident gaming establishment management system comprises a mystery bonus award server and the event comprises a mystery bonus award to be won independent of any displayed event occurring during a play of a game of the electronic gaming machine.

20. The method of claim 14, wherein the non-resident gaming establishment management system comprises a content management server and the event comprises an occurrence of a display, by a display device of the electronic gaming machine, of an externally controlled interface.

* * * * *